(12) United States Patent
Komann et al.

(10) Patent No.: US 12,465,552 B2
(45) Date of Patent: Nov. 11, 2025

(54) SUPPORTING STRUCTURE FOR CONCURRENTLY SUPPORTING A PLURALITY OF CONTAINERS FOR SUBSTANCES FOR PHARMACEUTICAL, MEDICAL OR COSMETIC APPLICATIONS, AND TRANSPORT STRUCTURE COMPRISING THE SAME

(71) Applicant: SCHOTT Pharma Schweiz AG, St. Gallen (CH)

(72) Inventors: Christian Komann, Speicher (CH); David Hilber, Uzwil (CH); Markus Renz, Riehen (CH)

(73) Assignee: SCHOTT Pharma Schweiz AG, St. Gallen (CH)

( * ) Notice: Subject to any disclaimer, the term of this patent is extended or adjusted under 35 U.S.C. 154(b) by 0 days.

(21) Appl. No.: 18/760,780

(22) Filed: Jul. 1, 2024

(65) Prior Publication Data
US 2024/0350362 A1   Oct. 24, 2024

Related U.S. Application Data

(63) Continuation of application No. 16/411,904, filed on May 14, 2019, now abandoned.

(30) Foreign Application Priority Data

May 14, 2018   (DE) ............... 10 2018 111 491.5

(51) Int. Cl.
*A61J 1/16*   (2023.01)
*A61J 7/00*   (2006.01)
(Continued)

(52) U.S. Cl.
CPC .............. *A61J 1/16* (2013.01); *A61J 7/0069* (2013.01); *B65B 43/54* (2013.01); *B65D 1/36* (2013.01); *B65D 71/70* (2013.01); *B01L 9/06* (2013.01)

(58) Field of Classification Search
CPC .......... B65D 1/36; B65D 71/70; A61J 7/0069; A61J 1/16; B01L 9/06; B65B 43/54
(Continued)

(56) References Cited

U.S. PATENT DOCUMENTS 3,342,397 A * 9/1967 Duitsman ................ B65D 1/36
                                                         D7/553.4
4,549,656 A * 10/1985 Barnes ................... B65D 81/022
                                                         206/443
(Continued)

FOREIGN PATENT DOCUMENTS

CN   103359348 A   10/2013
CN   206466359 U   9/2017
(Continued)

OTHER PUBLICATIONS

European Search Report dated Jun. 27, 2019 for European Patent Application No. 19 17 0288 (3 pages).
(Continued)

*Primary Examiner* — Steven A. Reynolds
(74) *Attorney, Agent, or Firm* — TAYLOR & EDELSTEIN, PC

(57) ABSTRACT

A supporting structure for concurrently supporting a plurality of containers for substances for pharmaceutical, medical or cosmetic applications, comprises a plurality of receptacles. The receptacles are arranged in a regular arrangement, are formed by circumferential side-walls, and an upper side of the supporting structure is formed as a plate-shaped carrier. The receptacles are polygonal in shape when
(Continued)

viewed in a plan view. A side-wall is formed as a common partition wall between respective two directly adjacent receptacles of the plurality of receptacles. The receptacles can be directly adjacent to each other, which enables optimum packing density, especially with a hexagonal basic shape of the receptacles. Due to the shared partition wall, filigree, double-walled structures can be effectively avoided, which considerably simplifies production by injection molding from a plastic material. Thereby, also a very high inherent stiffness of the supporting structure can be achieved.

20 Claims, 19 Drawing Sheets

(51) Int. Cl.
  *B65B 43/54* (2006.01)
  *B65D 1/36* (2006.01)
  *B65D 71/70* (2006.01)
  *B01L 9/06* (2006.01)

(58) Field of Classification Search
  USPC .......................................................... 206/564
  See application file for complete search history.

(56) References Cited

U.S. PATENT DOCUMENTS

| | | | |
|---|---|---|---|
| 5,285,907 | A | 2/1994 | Franchere et al. |
| 5,555,523 | A | 9/1996 | Haga et al. |
| 6,462,276 | B2 * | 10/2002 | Shimizu .................. H02G 3/26 220/3.3 |
| 9,555,911 | B2 | 1/2017 | Pawlowski |
| 9,718,583 | B2 | 8/2017 | Nicoletti et al. |
| 10,881,796 | B2 * | 1/2021 | Wei ..................... A61M 5/3204 |
| 12,098,018 | B2 * | 9/2024 | Nau ....................... B65D 71/70 |
| 2002/0081408 | A1 | 6/2002 | Spaller et al. |
| 2002/0088631 | A1 | 7/2002 | Shimizu et al. |
| 2006/0045815 | A1 | 3/2006 | Hovatter |
| 2009/0314675 | A1 | 12/2009 | Stahl |
| 2011/0192756 | A1 | 8/2011 | Hill |
| 2013/0048531 | A1 | 2/2013 | Nicoletti |
| 2014/0027333 | A1 | 1/2014 | Pawlowski |
| 2014/0027342 | A1 | 1/2014 | Pawlowski et al. |
| 2015/0166212 | A1 | 6/2015 | Wissner et al. |
| 2015/0166217 | A1 | 6/2015 | Deutschle et al. |
| 2017/0197745 | A1 | 7/2017 | Deutschle |
| 2018/0057249 | A1 * | 3/2018 | Bertolin ................. B65D 71/70 |
| 2018/0126066 | A1 * | 5/2018 | Narvekar .............. B65B 31/027 |
| 2018/0208377 | A1 | 7/2018 | Kloke et al. |
| 2019/0070357 | A1 | 3/2019 | Evans et al. |

FOREIGN PATENT DOCUMENTS

| | | |
|---|---|---|
| DE | 10 2012 103 896 A1 | 11/2013 |
| DE | 20 2016 107 209 U1 | 5/2018 |
| EP | 2 868 593 A1 | 5/2015 |
| IN | 925DE2012 | 3/2012 |
| WO | 2010/086128 A1 | 8/2010 |
| WO | 2012/126582 A1 | 9/2012 |
| WO | 2014/130349 A1 | 8/2014 |
| WO | 2017/038878 A1 | 3/2017 |
| WO | 2018/020505 A1 | 2/2018 |
| WO | 2018/114103 A1 | 6/2018 |

OTHER PUBLICATIONS

Extended European Search Report, with an English translation thereof, dated Jun. 10, 2021 for European Patent Application No. 21158799.3 (14 page).

Chinese Office Action dated Dec. 30, 2021 for Chinese Patent Application No. 201910368017.5 (10 pages).

English translation of Chinese Office Action dated Dec. 30, 2021 for Chinese Patent Application No. 201910368017.5 (10 pages).

India Office Action dated Jun. 16, 2022 for India Patent Application No. 201914014687 (6 pages).

Chinese Office Action dated Jul. 27, 2022 for Chinese Patent Application No. 201910368017.5 (6 pages).

Translation of Japanese Office Action dated Jan. 24, 2023 for Japanese Patent Application No. 2019-090696 (7 pages).

Chinese Office Action dated Feb. 22, 2023 for Chinese Patent Application No. 202211210491.3 (5 pages).

* cited by examiner

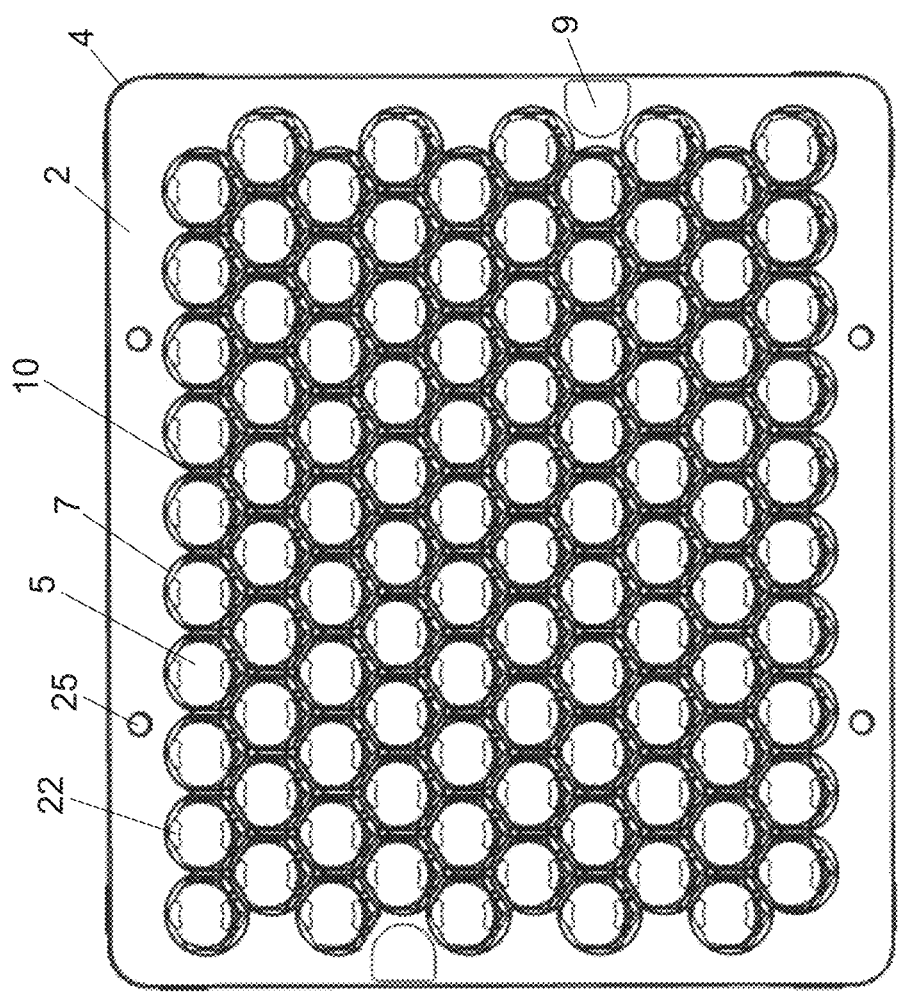

SUPPORTING STRUCTURE FOR CONCURRENTLY SUPPORTING A PLURALITY OF CONTAINERS FOR SUBSTANCES FOR PHARMACEUTICAL, MEDICAL OR COSMETIC APPLICATIONS, AND TRANSPORT STRUCTURE COMPRISING THE SAME

CROSS-REFERENCE TO RELATED APPLICATIONS

This is a continuation of U.S. patent application Ser. No. 16/411,904 entitled "SUPPORTING STRUCTURE FOR CONCURRENTLY SUPPORTING A PLURALITY OF CONTAINERS FOR SUBSTANCES FOR PHARMACEUTICAL, MEDICAL OR COSMETIC APPLICATIONS, AND TRANSPORT STRUCTURE COMPRISING THE SAME" filed on May 14, 2019, which is incorporated in its entirety herein by reference.

BACKGROUND OF THE INVENTION

1. Field of the Invention

The present invention in general relates to the treatment of containers for substances for pharmaceutical, medical or cosmetic applications, and in particular to a supporting structure for concurrently supporting a plurality of containers for substances for pharmaceutical, medical or cosmetic applications, such as vials, ampoules or cartridges.

2. Description of the Related Art

As containers for the storage and stocking of medical, pharmaceutical or cosmetic preparations with administration in liquid form, especially in pre-dosed quantities, medicine containers, such as vials, ampoules or cartridges, are used on a large scale. These generally have a cylindrical shape, can be made of plastics or glass and are available in large quantities at low cost. The containers are increasingly delivered to a pharmaceutical manufacturer or to a plant for further processing and are further processed in supporting structures in a predetermined geometric arrangement, while the containers are held or accommodated in the supporting structure. This requires cost-effective and durable supporting structures in which the containers are held or accommodated in a space-saving arrangement.

Chinese Patent Application CN 103359348-A discloses a supporting structure in the form of a tray having a bottom on which a plurality of vertical positioning pins is provided between which the containers can be received without mutual contact. The supporting structure is formed by injection molding of a plastic material. The vertical positioning pins also act as guide portions for inserting the containers into the receptacles formed by the positioning pins. However, the containers are held with relatively large clearance. The packing density of the containers that can be achieved is relatively low.

International Patent Application WO 2012/126582 A1 discloses a further supporting structure for syringe bodies, comprising a plate-shaped carrier on which a plurality of cylindrical receptacles with circumferential side-walls are formed. The syringe bodies rest with their retaining flanges on the upper ends of the cylindrical receptacles. To reinforce the carrier, the cylindrical receptacles are connected to each other via connecting webs on the underside of the carrier. The distance between the cylindrical receptacles is relatively large, so that the packing density that can be achieved with the supporting structure is not optimal.

International Patent Application WO 2014/130349 A1 discloses a similar supporting structure. The receptacles have no polygonal basic shape, but have a circular basic shape. Furthermore, adjacent receptacles are not disposed directly adjacent to each other.

International Patent Application WO 2017/038878 A1 discloses a further supporting structure comprising a plate-shaped carrier on which a plurality of cylindrical receptacles with circumferential side-walls are formed. The cylindrical receptacles are arranged at a relatively small distance from each other, which, however, makes the production of two side-walls at a relatively small distance from each other necessary. This requires very thin-walled, easily breakable and difficult-to-cool rib-like contours when manufacturing by plastic injection molding. This in turn leads to a very complex and therefore also expensive tool during tool design. In addition, such a design can also have a negative effect on the service life of the mold used for injection molding. Since the filigree structures cannot be cooled during injection molding, or can only be cooled very laboriously, the design also has a negative effect on the cycle time of the manufacturing process, which leads to higher unit costs.

German Utility Model DE 20 2016 107 209 U1 discloses a further supporting structure of the aforesaid type in which internal receptacles of the supporting structure are formed by axial positioning cylinders and separation webs connecting the positioning cylinders together. This arrangement allows a higher packing density of the containers. However, the production of the supporting structure by plastic injection molding is relatively complex. German Utility Model DE 20 2016 107 209 U1 discloses another supporting structure for pharmaceutical containers, which is manufactured from a plastic material by injection molding. However, the receptacles do not have a polygonal cross-section and are not formed by circumferential side-walls. Positioning cylinders, which are connected to each other via separating webs, are used to position the pharmaceutical containers. The actual lateral support of the pharmaceutical containers is provided by guide ribs formed on the surfaces of the positioning cylinders.

U.S. Patent Application 2018/0208377 A1 discloses a further supporting structure in which the holders are formed by relatively thin separating and connecting webs, which makes the production of the supporting structure by plastic injection molding relatively complex.

U.S. Patent Application 2015/0166217 A1 discloses in FIGS. 5 and 6 a transport and packaging container for pharmaceutical containers, wherein a supporting structure having a plurality of honeycomb-shaped receptacles for receiving the pharmaceutical containers therein is arranged on a bottom of the transport and packaging container. The receptacles must be flexible and expandable in order to allow the pharmaceutical containers to be inserted, but then to keep them clamped in place. Other supporting structures are also disclosed, in which the side-walls of the receptacles can be adjusted relative to each other in order to temporarily expand the receptacles for inserting the pharmaceutical containers.

Similar supporting structures are disclosed in German Patent Application DE 10 2012 103 896 A1.

International Patent Application WO 2010/086128 A1 discloses a supporting structure according to the preamble of claim 1 which is produced by plastic injection molding. The supporting structure comprises a plurality of receptacles for supporting the containers, which are arranged in a regular arrangement and are polygonal in shape when viewed in a plan view. To be more precise, the receptacles are formed by star-shaped positioning protrusions, which are formed integrally with the bottom of a tub-shaped carrier. The star-shaped positioning protrusions are arranged at a distance from each other and are not directly connected to each other. This supporting structure can be produced cost-effectively by injection molding from a plastic material. For a sufficient stiffness of the carrier, however, it must be designed to be relatively stable, which results in higher weight and higher material costs.

There is therefore a need for further improvement in the manufacture of supporting structures of the aforementioned type.

SUMMARY OF THE INVENTION

Exemplary embodiments disclosed herein provide an improved supporting structure for concurrently supporting a plurality of containers for substances for pharmaceutical, medical or cosmetic applications, which can be easily and cost-effectively manufactured and which provides advantageous high stiffness and high packing density of the containers. It should be possible to insert the containers easily and reliably into the receptacles of the supporting structure and to remove them from them again. Further aspects of the present invention relate to transport structures or transport or packaging containers and to a sterile packaging structure with such a supporting structure.

According to the present invention there is provided a supporting structure for concurrently supporting a plurality of containers for substances for pharmaceutical, medical or cosmetic applications, comprising a plurality of receptacles for receiving the containers. The receptacles are arranged in a regular arrangement and are formed by respective circumferential side-walls, an upper side of the supporting structure is formed as a plate-shaped carrier, and the side-walls and receptacles project perpendicularly from the plate-shaped carrier.

According to exemplary embodiments of the invention, the receptacles are polygonal in shape when viewed in a plan view, i.e. with a polygonal basic shape; a side-wall is formed as a common partition wall between two directly adjacent receptacles of the plurality of receptacles.

The receptacles can therefore be disposed directly adjacent to each other, which enables an optimum packing density. Due to the shared partition wall, filigree, double-walled structures can be effectively avoided, which considerably simplifies production by injection molding of a plastic material. Thin-walled rib-like contours in tool design, which can easily break and are difficult to cool, can thus be avoided according to the present invention, resulting in a longer tool life. Furthermore, the cycle time of the manufacturing process can be significantly shortened and unit costs can be reduced.

In particular, the partition walls can be relatively thin-walled and yet a high inherent stiffness of the supporting structure can be achieved. This allows a relatively low weight of the supporting structure with reduced material usage and low manufacturing costs.

At the same time, a very high inherent stiffness of the supporting structure can be achieved, because all side-walls are directly connected to each other via corner regions of the receptacles and together form a highly symmetrical hollow honeycomb structure, formed by the side-walls protruding perpendicularly from a plate-shaped upper side of the supporting structure.

In the context of the present invention, a common or shared partition wall shall mean, in particular, that the partitions, when viewed in a cross-section, are each formed integrally and without any substantial perforations. The height of the respective common partition wall essentially corresponds to the axial length of the two directly adjacent receptacles, so that the respective common partition wall may be made of a solid material over at least 80% of this height.

Because the upper side of the supporting structure is designed as a plate-shaped carrier, with the side-walls and the receptacles protruding perpendicularly to it, the inherent stiffness of the supporting structure can be further increased.

In some embodiments, the side-walls of the receptacles are each formed as planar, flat partitions, the side-walls of directly adjacent receptacles converging in a connecting region which extends in the longitudinal direction of the receptacles and is arranged in a corner region of the respective receptacles. This results in connection regions of highly symmetrical shape, which, for example in the case of a hexagonal arrangement of the receptacles, are star-shaped when viewed in a plan view. This enables a highly symmetrical transfer of forces, which results in an advantageously high inherent stiffness of the supporting structure.

In some embodiments, the receptacles are hexagonal in shape when viewed in a plan view and arranged directly adjacent to each other in a regular arrangement with hexagonal symmetry.

In some embodiments, the receptacles are octagonal in shape when viewed in a plan view, with four adjacent receptacles arranged in a rhombic arrangement enclosing a central connecting portion whose thickness is greater than the thickness of the common partition walls.

In some embodiments, the central connecting portions each enclose a cavity that extends in the longitudinal direction of the adjacent receptacles. Conveniently, this hollow space has a circular or rectangular cross-section. In the manufacture of the supporting structure by injection molding from a plastic material, this cavity is conveniently defined by a cuboid protrusion on one half of a molding tool, which extends in opposite directions to mandrels on a second half of a molding tool, which define the shape of the receptacles. A protrusion at the upper end of this cylindrical or parallelepipedal protrusion of the mold can serve as a rigid connection with the opposite half of the mold, making the supporting structure even more precise.

In some embodiments, a plurality of apertures, in particular circular openings, are formed in the upper side of the plate-shaped carrier so that a gas can flow from the upper side to the underside of the plate-shaped support. This can advantageously support steam sterilization of the supporting structure and the containers held on it.

In some embodiments, the apertures are formed as circular openings and on the underside of the plate-shaped support, frustoconical protrusions are formed which enclose the openings. The protrusions can be used, for example, as spacer members to define the distance between two supporting structures in a vertically stacked arrangement.

In some embodiments, the upper ends of the side-walls facing an upper side of the supporting structure have an arched concave shape. In particular, the upper ends of the side-walls do not protrude from the upper side of the supporting structure at any point. This makes it easier to stack the supporting structures vertically on top of each other, as unwanted tilting of the upper ends of the side-walls is avoided.

In some embodiments, guide ribs are formed on the side-walls which extend in the longitudinal direction of the receptacles and support the capturing or insertion of the containers into the upper ends of the receptacles. The upper ends of the guide ribs may have lead-in bevels which are inclined relative to the guide ribs to further facilitate insertion of the containers into the receptacles from the upper side of the supporting structure.

In some embodiments, the guide ribs are arranged in corner regions of the receptacles, a flattened portion is provided at least at the lower ends of the guide ribs, the corner regions of which are rounded. This optimized design of the guide ribs facilitates a low-abrasion insertion of the containers even if they are not centered but tilted relative to the center axis of the receptacles, as explained in more detail further herein.

In some embodiments, the guide ribs protrude inwards into the receptacles in one direction towards the geometric center of the respective receptacle.

In some embodiments, holding portions are provided at the lower ends of the receptacles in order to hold or retain the containers in the receptacles and to limit the axial mobility of the containers in the receptacles towards the lower end of the receptacles. Basically, one holding portion, which is arranged at a suitable position at the lower end of the respective receptacle, is sufficient for this purpose. Conveniently, two holding portions are disposed diametrically opposite to each other at the lower ends of the receptacles. In principle, however, the holding portions may also be circumferential or essentially circumferential, with one or more apertures formed along the circumference of the respective receptacle at its lower end.

In some embodiments, the lower ends of the receptacles each merge into a circular end ring having a central opening. On the one hand, this end ring keeps the distance between the lower ends of the side-walls constant, which further increases the inherent stiffness of the supporting structure. On the other hand, this end ring allows an advantageously symmetrical flow of force, which also further increases the inherent stiffness of the supporting structure.

In some embodiments, the lower ends of the side-walls of the receptacles jointly span a plane that extends in parallel with an upper side of the supporting structure. The lower ends of the side-walls form point symmetrical connecting regions corresponding to the symmetry of the arrangement of the receptacles, which further improves the flow of force in the supporting structure and further increases the inherent stiffness of the supporting structure.

In some embodiments, the end rings project beyond the plane jointly spanned by the lower ends of the side-walls, thus forming another plane in which the lower ends of the side-walls of the receptacles are connected to each other.

In some embodiments, an outer diameter of the end rings is smaller than a minimum opening width of the receptacles on an upper side of the supporting structure, so that a plurality of supporting structures of identical configuration can be arranged in a stacked arrangement in which the end rings of the upper supporting structure dip into upper ends of the receptacles of an underneath lower supporting structure. This favors a vertically stacked arrangement of several supporting structures of identical configuration.

In some embodiments, spacer members are provided on an underside of the supporting structure to mechanically limit a depth of insertion of the end rings of an upper supporting structure into the upper ends of the receptacles of the underneath lower supporting structure.

According to the present invention, very precise positioning and guidance of the containers in the receptacles is possible, especially in the case of long, thin or slim containers, while achieving a very high packing density, because glass-to-glass contact of containers becomes less likely with increasing restrictions on freedom of movement.

The necessary guide length can also be reduced by greatly reducing the freedom of movement of the containers in the receptacles. This is relevant, for example, for long, thin or slim containers, such as cartridges or syringe cylinders, especially with small formats, because these can often only be inserted up to the lower half into the receptacles. Due to the very precise positioning and guidance of the containers according to the present invention, it is nevertheless possible to reliably ensure that there is no glass-to-glass contact. Thus material can also be saved according to the present invention.

In some embodiments, the guide ribs may even have a certain extension in the circumferential direction of the receptacles, i.e. need not only be designed as linear, very narrow ribs, because this results in a reduced surface pressure when the receptacles are accommodated in the receptacles, so that the local particle quantity due to material abrasion at the guide ribs is smaller, i.e. it is then less critical for optical inspection systems. Namely, a reduction of the surface pressure results in lower mechanical loads on the surfaces (i.e. the softer plastic surfaces of the supporting structure).

In some embodiments, the length of the receptacles is matched to the length of the containers so that the upper or lower ends of the containers protrude from the receptacles and are therefore freely accessible from above the supporting structure. This can be used for further processing or treatment of the containers while they are accommodated in the receptacles and held by the supporting structure. For example, a supporting structure (so-called nest) can be temporarily held in a holding frame of a process station, e.g. at a filler of drugs, while the substance is filled into the containers held on the supporting structure via the filling openings. Or stoppers or plugs are pushed into the ends of the containers to close the containers while the containers are held by the supporting structure. Or the ends protruding from the receptacles can be used to grip the containers and remove them from the receptacles.

In some embodiments, a transport structure for containers is provided consisting of a combination of the supporting structure as disclosed above and a plurality of containers for substances for pharmaceutical, medical or cosmetic applications held thereon, the containers are accommodated at least in sections in the receptacles of the supporting structure and are axially secured to the supporting structure as outlined above. For this purpose, the supporting structure may be designed in particular as a so-called nest for holding vials, cartridges or similar pharmaceutical containers.

In some embodiments, the containers are cylindrical and have an upper end with a constricted neck portion and a shoulder portion adjoining the constricted neck portion and merging into a cylindrical side-wall of the containers, the opening width of openings at the lower ends of the receptacles is matched to an outer diameter of the upper ends of the containers in such a manner that the upper ends of the containers extend through the openings and that the shoulder portions of the containers are directly supported on holding protrusions to limit the axial mobility of the containers in the receptacles when the containers are accommodated upside-down in the receptacles.

In some embodiments, there is provided a transport structure for containers consisting of a combination of the supporting structure as disclosed above and a plurality of containers for substances for pharmaceutical, medical or cosmetic applications held thereon, the containers are accommodated in the receptacles and axially secured to the supporting structure. In particular, the containers may be designed as vials, which are held or supported upright in the receptacles of the supporting structure.

In some embodiments, there is provided a transport or packaging container for a plurality of containers for substances for pharmaceutical, medical or cosmetic applications, the transport or packaging container being box-shaped, a supporting structure, which is formed as a so-called nest, as outlined above, is accommodated in the box-shaped transport or packaging container together with the containers held thereon, to hold the plurality of containers inside the transport or packaging container.

Particularly, the transport or packaging container may be closed or sealed by a gas-permeable plastic film, in particular by a plastic film which is formed from a gas-permeable braid of plastic fibers and in particular is a Tyveck® film, in order to enable sterilization of the containers by the inflow of a gas through the gas-permeable plastic film.

For sterile transport and storage, a sterile packaging structure may further be provided, comprising at least one transport structure as outlined above or at least one transport or packaging container as outlined above and the containers accommodated therein, the at least one transport structure or the at least one transport or packaging container is accommodated in at least one sterile outer packaging bag and sterilely packed against the environment. Here, the at least one sterile outer packaging bag may comprise a gas-permeable portion which is formed in particular by a braid of plastic fibers, such as polypropylene fibers (PP).

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1A illustrates an exemplary embodiment of a supporting structure provided according to the present invention in a plan view;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1B:
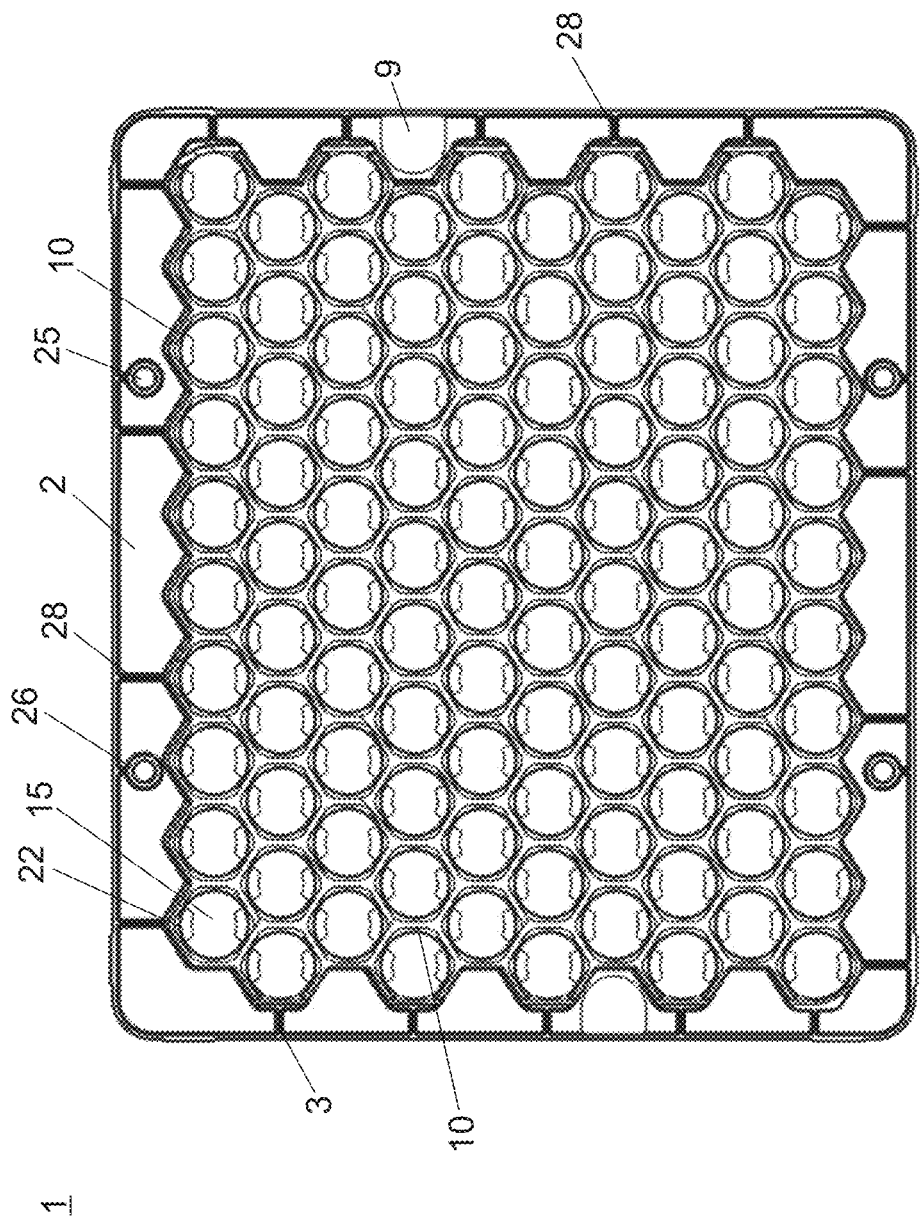
FIG. 1B illustrates the supporting structure of FIG. 1A in a view from below.

FIGS. 1A to 1D show an exemplary embodiment of a supporting structure 1 provided according to the present invention in different views. The supporting structure 1 comprises a plurality of receptacles 5 which are arranged in a regular arrangement and serve for accommodating pharmaceutical containers, in particular vials or cartridges, therein. According to the present invention the receptacles 5 have a polygonal cross section. A hexagonal basic shape may be used, as shown in the embodiment of FIGS. 1A to 1F, or an octagonal basic shape, as shown in the embodiment of FIGS. 3A to 3G. In principle, however, a triangular basic shape or a square, rectangular or rhombic basic shape is also conceivable.

In correspondence to the basic shape of the receptacles 5, they are arranged directly adjacent to each other in a regular arrangement. Thus in FIG. 1A a hexagonal, honeycomb-shaped arrangement of the receptacles 5 can be seen, and in FIG. 3A an octagonal arrangement. Generally, however, the receptacles can be arranged in rows and columns extending perpendicularly thereto.

The opening width of the receptacles 5 of identical shape is matched to a maximum outer diameter or maximum outer dimension of the containers to be accommodated therein in such a manner that only a relatively small clearance is required to accommodate them. The containers may be accommodated in the receptacles 5 over by far the largest part of their axial length in order to prevent unwanted tilting or wobbling of the containers in the receptacles. The clearance of the containers in the receptacles 5 is adjusted appropriately by guide ribs, as explained in more detail further herein.

The receptacles 5 are formed by side-walls 10, which are formed circumferentially, which should not rule out the possibility that, for example, to reduce weight or save material, cutouts or recesses are formed in the side-walls 10 in sections. The side-walls 10 may protrude at right angles from the plate-shaped upper side 2 of the supporting structure 1. In order to facilitate the demolding of the supporting structure 1 from a mold used for injection molding, the side-walls can in principle also be inclined radially inwards at a relatively small angle of, for example, a maximum of 1° or a maximum of 2° to a vertical on the upper side 2.

As shown in FIG. 1A, due to the polygonal basic shape of the receptacles 5, a common partition wall is formed between two directly adjacent receptacles 5, which also serves as a side-wall 10 of both receptacles 5 adjacent to each other. This means that the side-walls 10 are formed integrally and of a solid material, i.e. rectangular in cross-section. This should expressly not exclude the possibility that slits or recesses are provided at the lower or upper ends of the side-walls 10. In any case, the side-walls used as common partitions are made of a solid material over at least 80% of their height (H; cf. FIG. 1E or 3D).

To facilitate the handling of the supporting structure 1, its upper side is designed as a plate-shaped carrier 2 with rounded corners. The supporting structure 1 can be gripped by access openings 9 in the upper side 2, which are provided offset to each other on two opposite sides of the supporting structure 1. Furthermore, openings 25 are formed as through-holes at several positions in the plate-shaped carrier 2, which can serve in particular as positioning holes in order to enable the supporting structure 1 to be aligned precisely in position on a supporting structure receptacle with corresponding positioning pins or protrusions, which is particularly useful, for example, when inserting (nesting), filling, closing or removing (denesting) the containers accommodated in the supporting structure. On the underside of carrier 2, these openings 25 may be enclosed by frustoconical protrusions 26 as shown in FIG. 1B, which may also serve as spacer members to adjust the spacing between supporting structures when stacked one above the other, as described in more detail further herein with reference to FIGS. 2A to 2D.

Figure 1C:
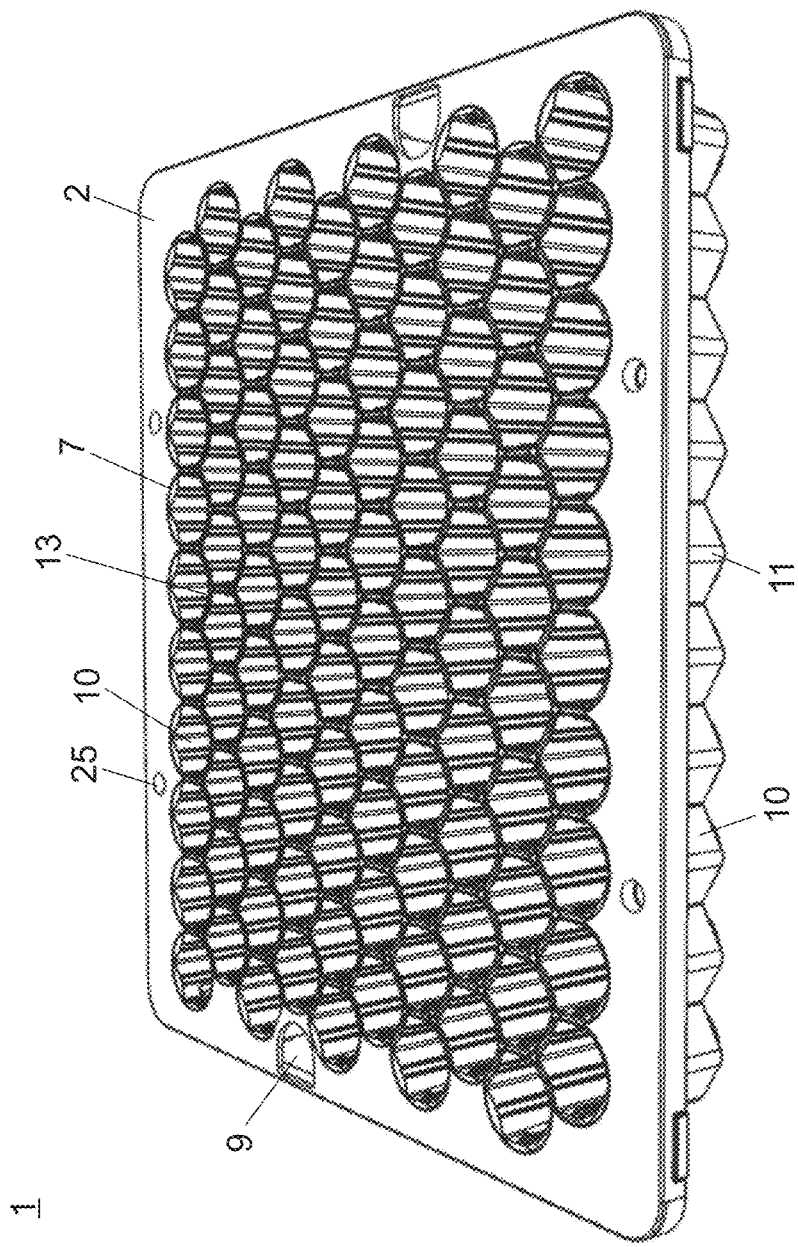
FIG. 1C illustrates the supporting structure of FIG. 1A in a perspective top view from a first side.
Figure 1D:
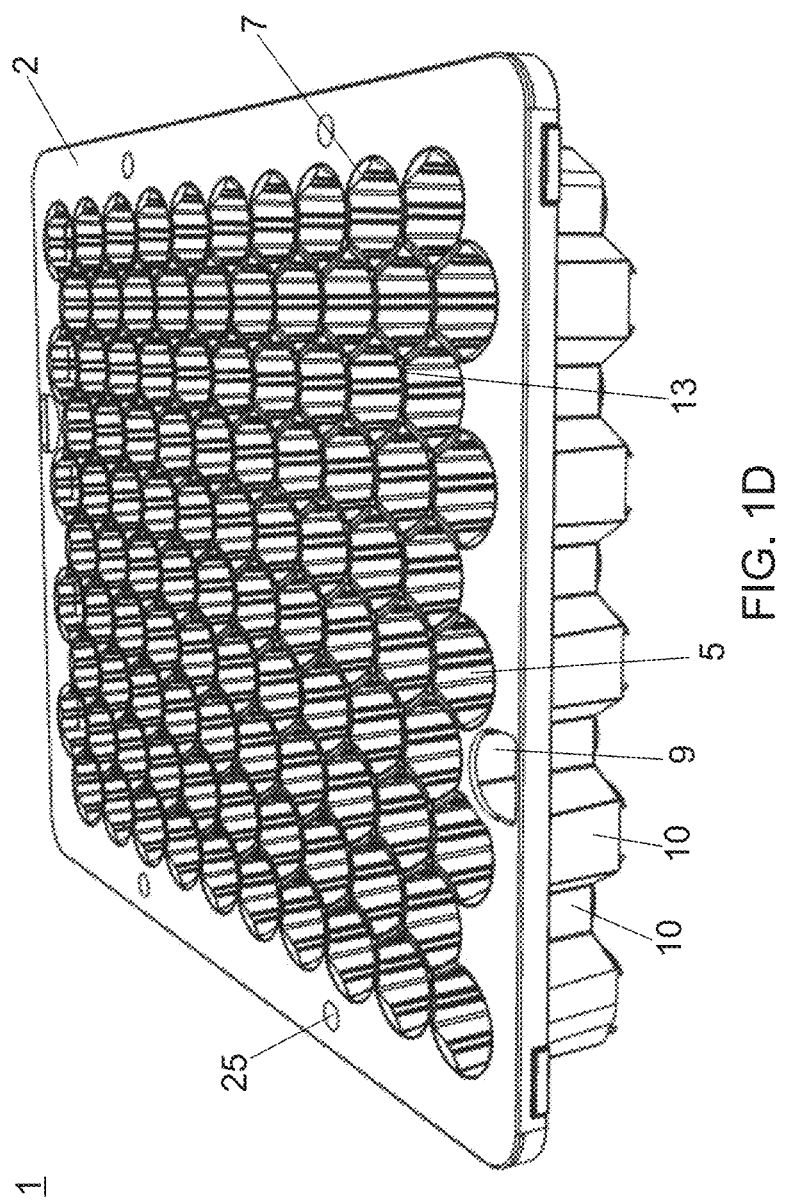
FIG. 1D illustrates the supporting structure of FIG. 1A in a perspective top view from a second side.
Figure 1E:
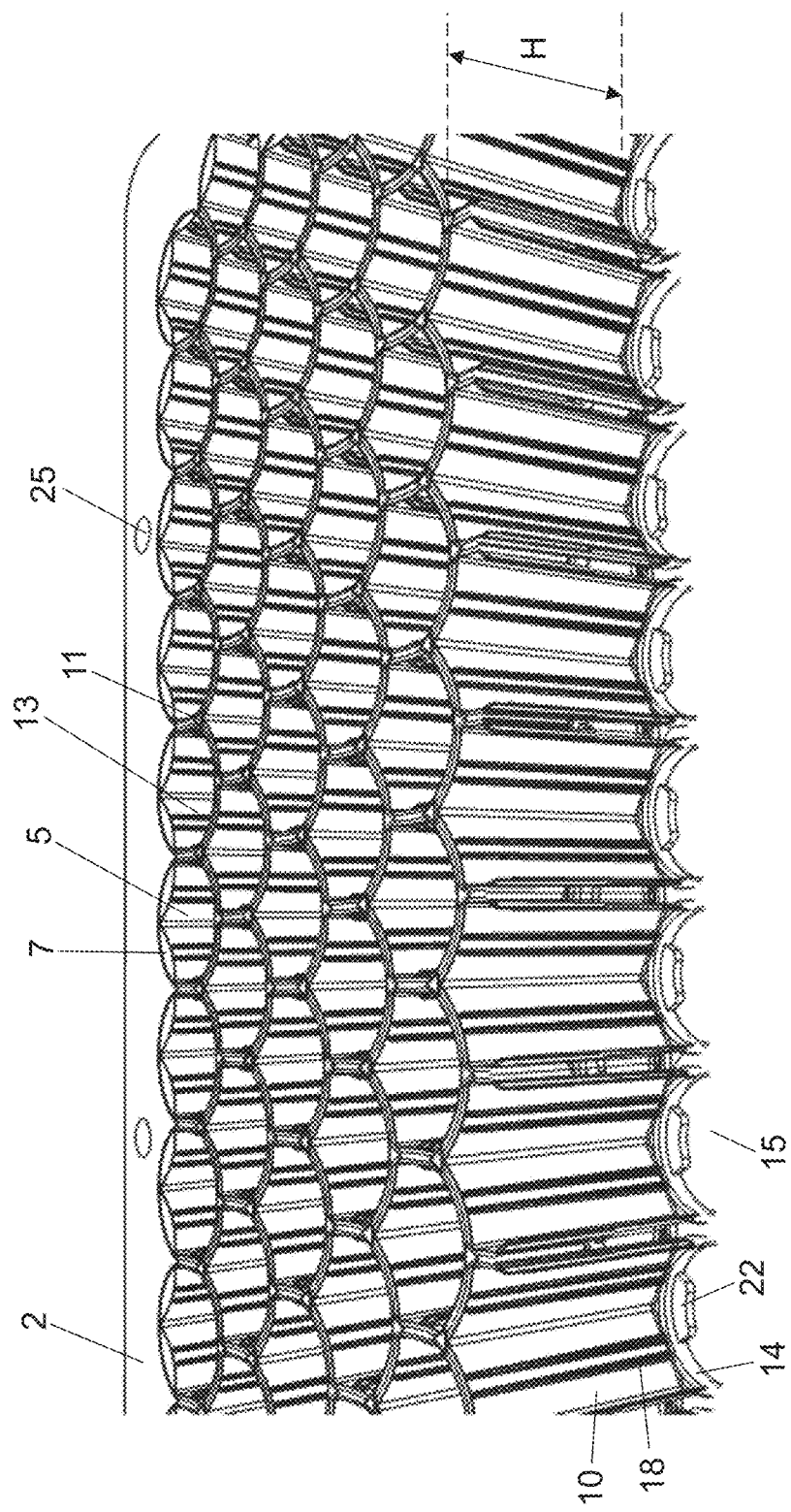
FIG. 1E illustrates the supporting structure of FIG. 1A in a perspective partial section.

As shown in FIGS. 1C to 1E, the upper ends of the side-walls 10 facing the upper side 2 of the supporting structure 1 may have an arcuately concave course, with a cusp in the centre between respective corner regions 12 of the receptacles 5 and with vertices at the connecting regions 11 of several side-walls 10. In any case, in some embodiments the upper ends of the side-walls 10 do not project beyond the upper side 2 of the supporting structure 1, which allows the supporting structures to be stacked, as described in more detail further herein with reference to FIGS. 2A to 2D.

As shown in FIG. 1B, in the hexagonal arrangement of the receptacles 5 shown three side-walls 10 each converge in star-shaped connecting regions 11. All connecting regions 11 are directly connected to each other via the associated side-walls 10. There are no double-walled structures on the underside of supporting structure 1, so that the supporting structure 1 has an advantageously high inherent stiffness even with low wall thicknesses of the side-walls 10 and upper side 2. This inherent stiffness is increased by the fact that, in accordance with FIG. 1B, the outer side-walls 10 of the receptacles 5 facing the edge 3 of the supporting structure 1 are directly connected to one another, forming a circumferential, zigzag-shaped edge web on the underside of the supporting structure 1. To further increase the stiffness of the supporting structure 1, the edge 3 is angled at right angles to the upper side 2 (see FIG. 1C). In order to further increase the stiffness of the supporting structure 1, the aforementioned circumferential, zigzag-shaped edge web on the underside of the supporting structure 1 is connected to the angled edge 3 at several positions via connecting webs 28.

Holding protrusions 22 acting as holding portions are provided at the lower ends of the receptacles 5, which extend radially inwards into the receptacles 5. Each receptacle 5 has two holding protrusions 22 which are diametrically opposite to each other. The holding protrusions 22 limit the axial mobility of the containers accommodated in receptacles 5 by a positive locking and retain the containers in the receptacles 5, as described in more detail below with reference to FIGS. 4B and 4C. In principle, a single holding protrusion 22 is also sufficient for this purpose, which may also be designed to be circumferential or essentially circumferential.

Figure 1F:
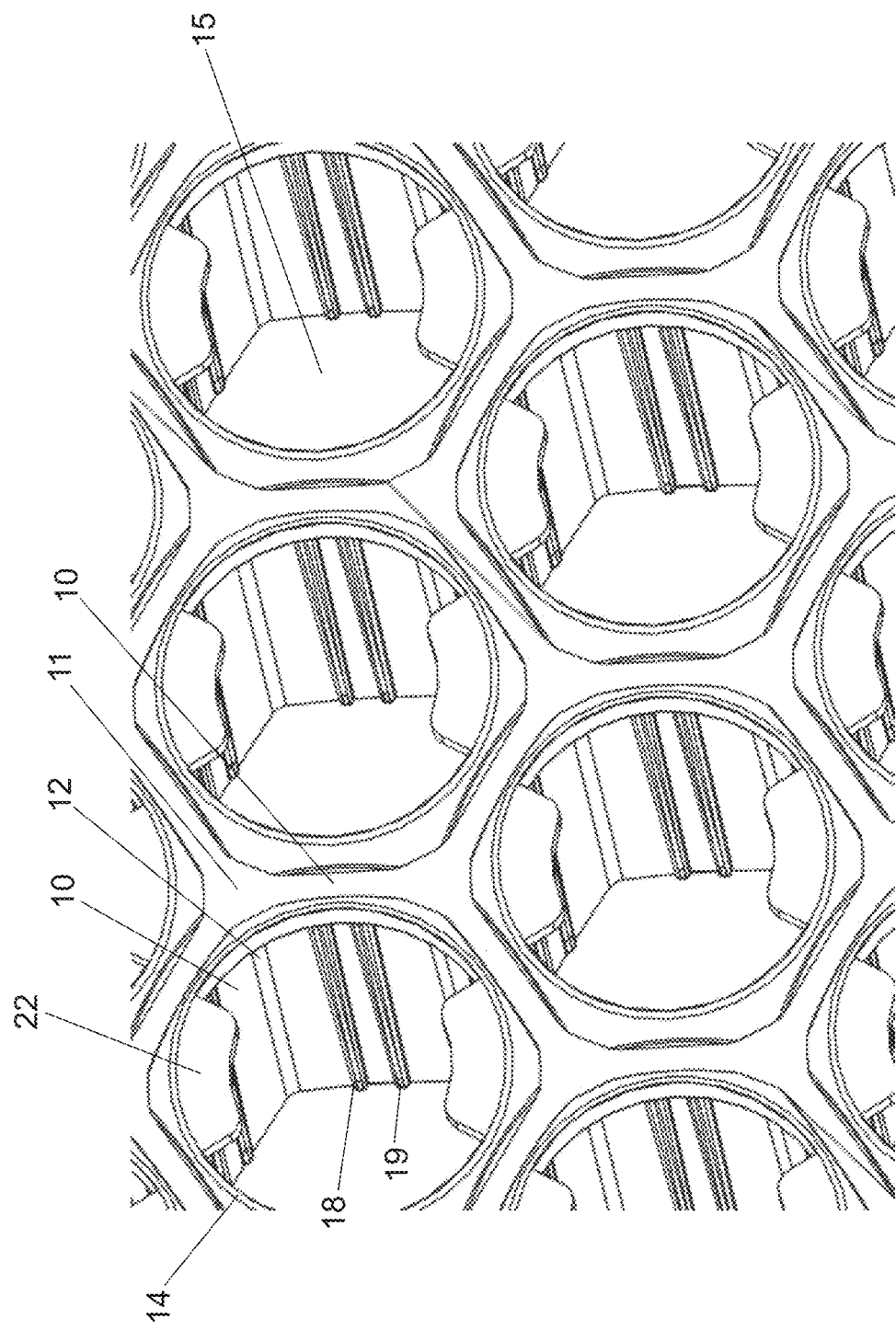
FIG. 1F is a perspective view of the supporting structure of FIG. 1A from below in a highly magnified view.

At their lower ends, the receptacles 5 are axially bounded by circumferential end rings 14, which are connected to the lower ends of the side-walls 10. The aforementioned holding protrusions 22 may be formed on these end rings 14. As illustrated in FIG. 1F, for example, the protrusions 22 can be cantilevered to the end rings 14 and extend about a portion of a circumference of the receptacles 5. As can be concluded from FIG. 1F, the lower ends of the side-walls 10 together form a hexagonal pattern with openings (the openings 15). In some embodiments, the lower ends of the side-walls 10 together span a plane that extends in parallel with the plate-shaped upper side 2 of the supporting structure 1. The end rings 14 project downwards from this plane. The end rings 14 form a continuous transition between the polygonal (here hexagonal) basic shape of the receptacles 5 and a circular ring which encloses the openings 15 at the lower ends of the receptacles 5. This offers advantages when designing mold halves for injection molding the supporting structure 1.

As can be seen from FIG. 1F, the side-walls 10 in the corner regions 12 are connected to each other over the entire axial length of the receptacles 5. The point symmetrical (here star-shaped) connecting regions 11 ensure an even flow of force. Overall, these measures increase the inherent stiffness of the supporting structure 1.

Guide ribs 18 are provided on all side-walls 10 of the receptacles 5, which protrude radially inwards into the receptacles 5, so that the side-walls of the containers lie directly against the guide ribs 18 and are guided by these when they are inserted into the receptacles 5. The guide ribs 18 essentially extend over the entire length of the receptacles 5 in their longitudinal direction. The guide ribs 18 may begin at a slight distance from the upper side 2 of the supporting structure 1 and extend down to the lower end of each receptacle 5, or more precisely to the transition region to the end rings 14. Lead-in bevels 19 which are inclined at an acute angle relative to the guide ribs 18 may be formed at the upper ends of the guide ribs 18. In the embodiment shown in FIG. 1F, the guide ribs 18 are designed as flat lead-in bevels. The upper ends of the lead-in bevels 19 merge into the side-walls 10. The guide ribs 18 can become wider symmetrically from the upper end to the lower end in the longitudinal direction of the receptacles 5.

Although it is shown that the guide ribs 18 are arranged in the middle region of the side-walls 10, according to the present invention the guide ribs 18 may be arranged in the corner regions 12 of the receptacles 5, as shown for the embodiment of FIGS. 3A to 3G. The clearance of the containers in the receptacles 5 can be precisely adjusted by the excess length of the guide ribs from the associated side-wall 10 or from the associated corner region 12.

As can be concluded from FIG. 1F, an outer diameter of the end rings 14 is smaller than a minimum opening width of the receptacles 5 at their upper ends. This allows identical supporting structures to be stacked on top of each other to save space. Such a stacked arrangement of two supporting structures 1a and 1b of identical configuration is described further herein in more detail with reference to FIGS. 2A to 2D.

In this stacked arrangement, the end rings 14 at the lower ends of the receptacles 5 of an upper supporting structure 1a are slightly inserted in the upper ends of the receptacles 5 of the underneath lower supporting structure 1b, so that the upper supporting structure 1a cannot slip laterally relative to the lower supporting structure 1b due to this positive locking. In the embodiment shown, the insertion depth or the distance between the supporting structures 1a, 1b is adjusted by spacer members 31, which rest on or engage in an associated structure on the upper side of a lower supporting structure 1b. As can be concluded from FIG. 2A, several rectangular slots or recesses 30 are formed on the upper sides 2 of the supporting structures 1a, 1b and several corresponding (rectangular) spacer members 31 are provided on the lower sides of the supporting structures 1a, 1b, which interlock positively in the stacked arrangement.

Figure 2A:
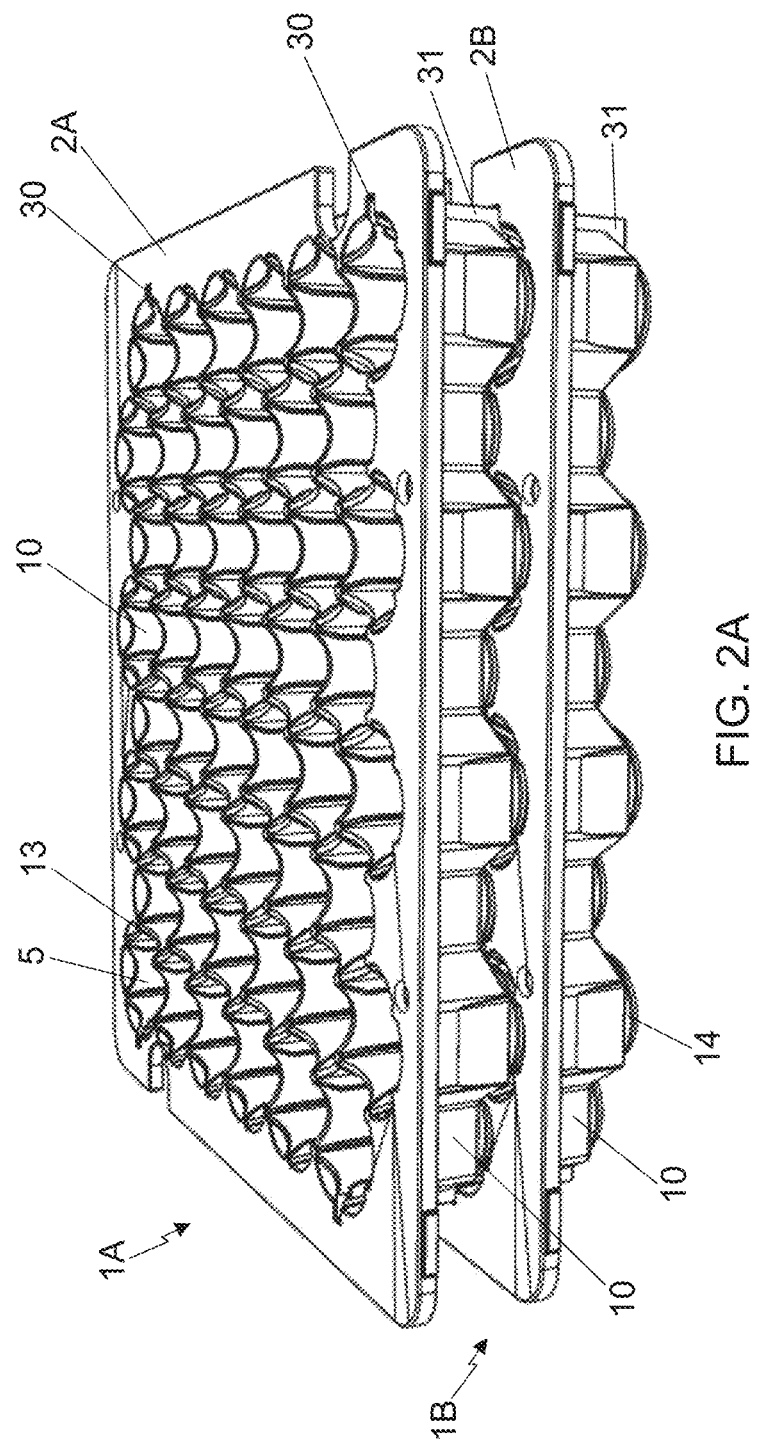
FIG. 2A illustrates the stacked arrangement of two supporting structures provided according to another exemplary embodiment of the present invention in a perspective side view.
Figure 2B:
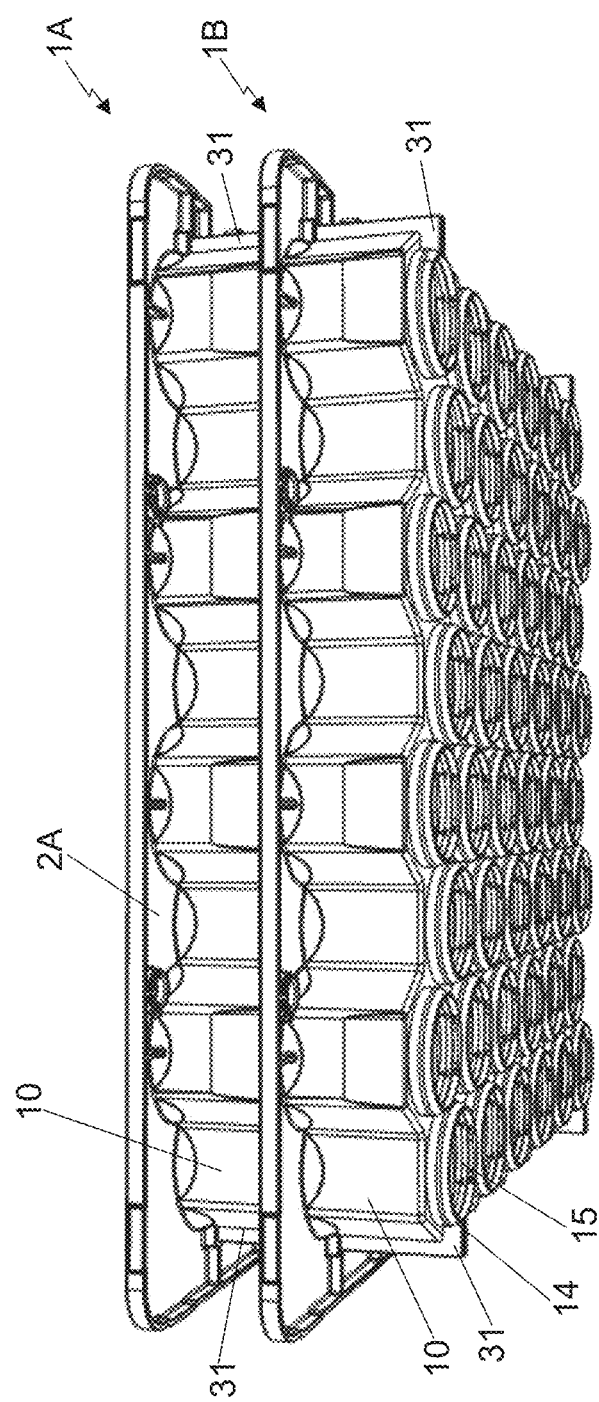
FIG. 2B illustrates the stacked arrangement of two supporting structures of FIG. 2A in a perspective view from below.
Figure 2C:
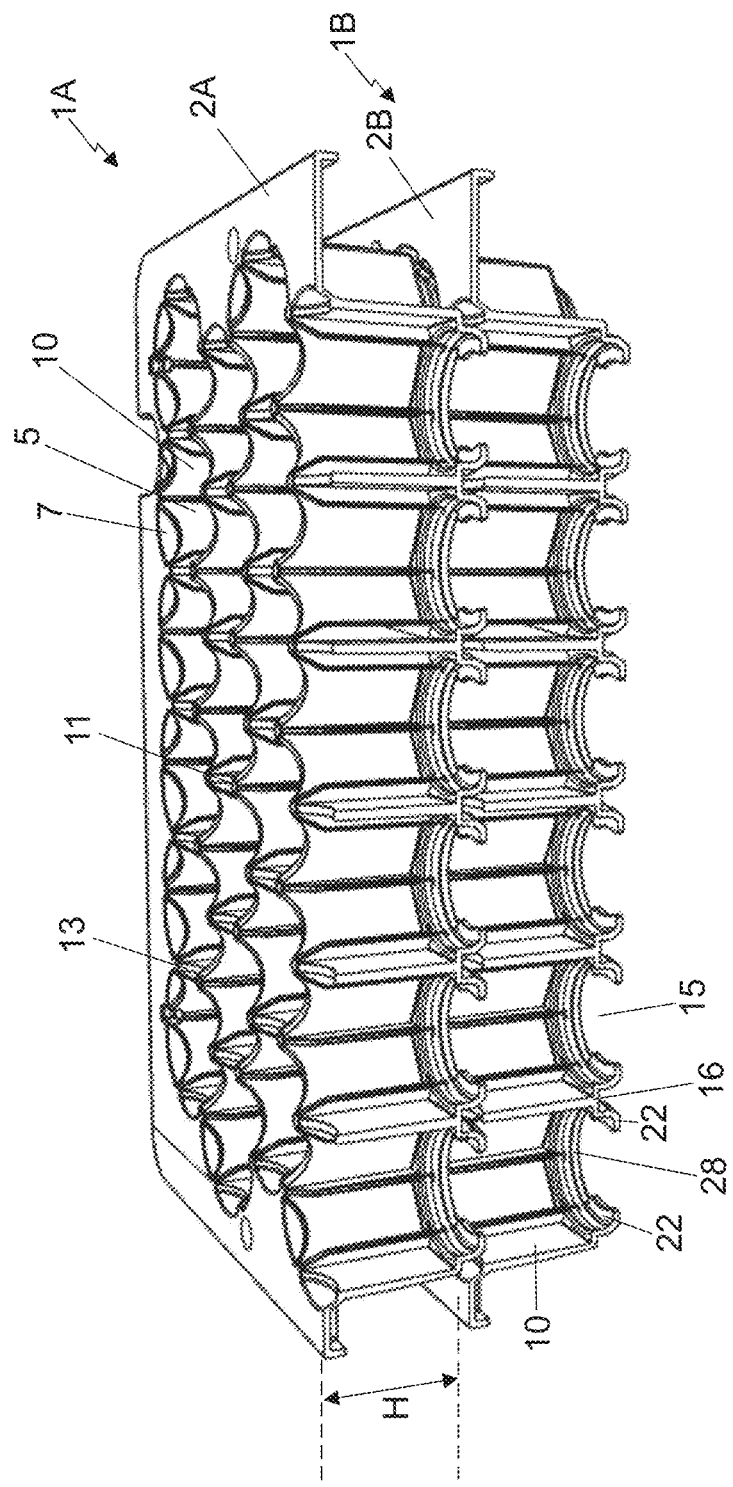
FIG. 2C illustrates the stacked arrangement of two supporting structures of FIG. 2A in a perspective partial section and viewed in a plan view.
Figure 2D:
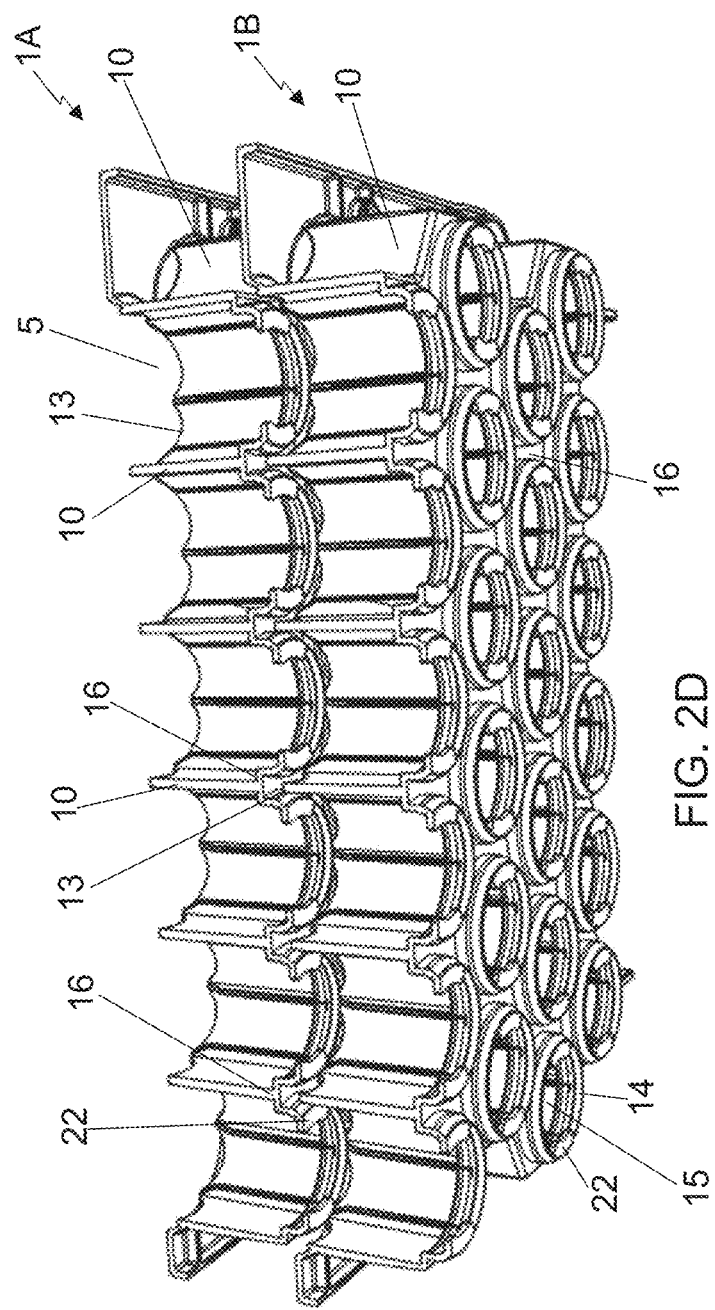
FIG. 2D illustrates the stacked arrangement of two supporting structures of FIG. 2A in a perspective partial section and viewed from below.
Figure 3A:
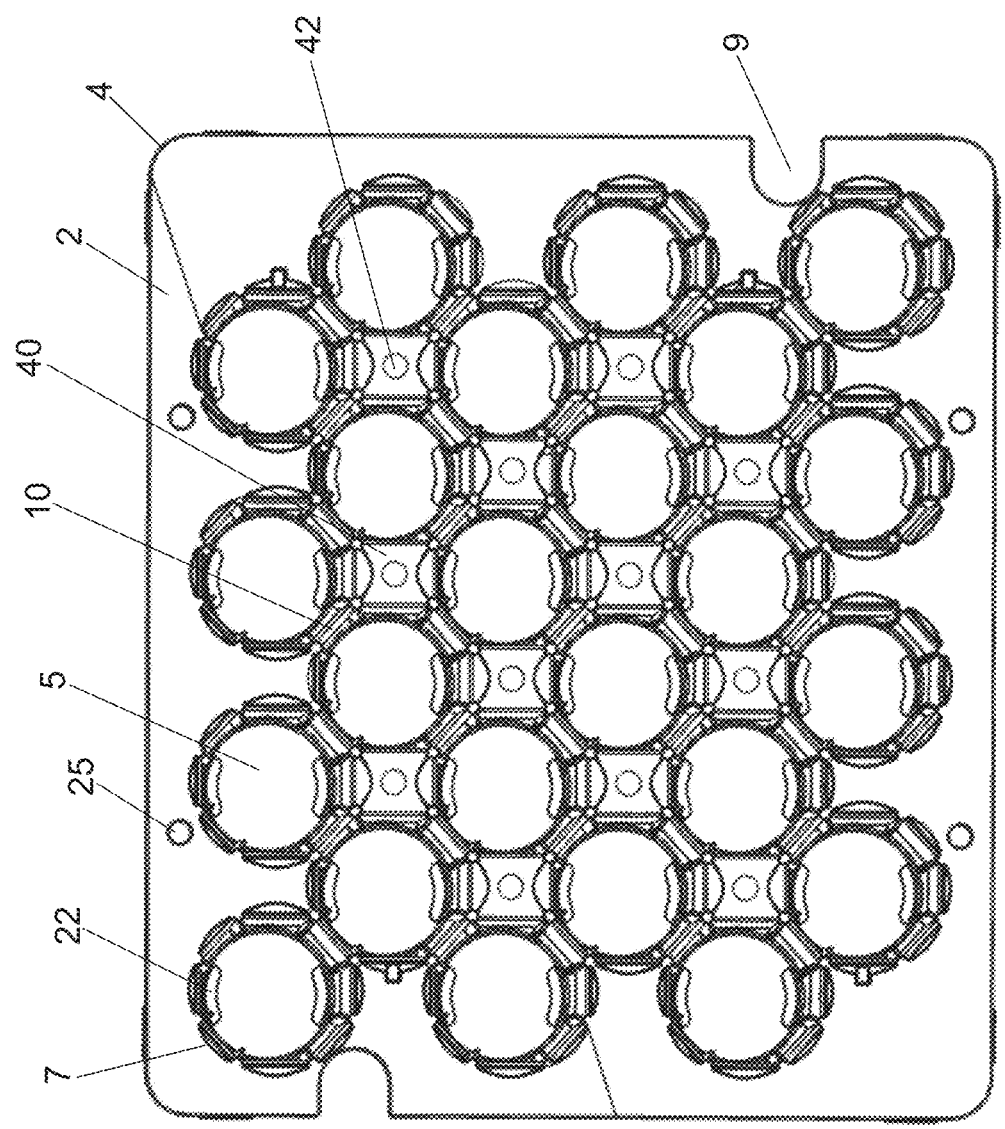
FIG. 3A illustrates an exemplary embodiment of a supporting structure provided according to the present invention in a plan view.
Figure 3B:
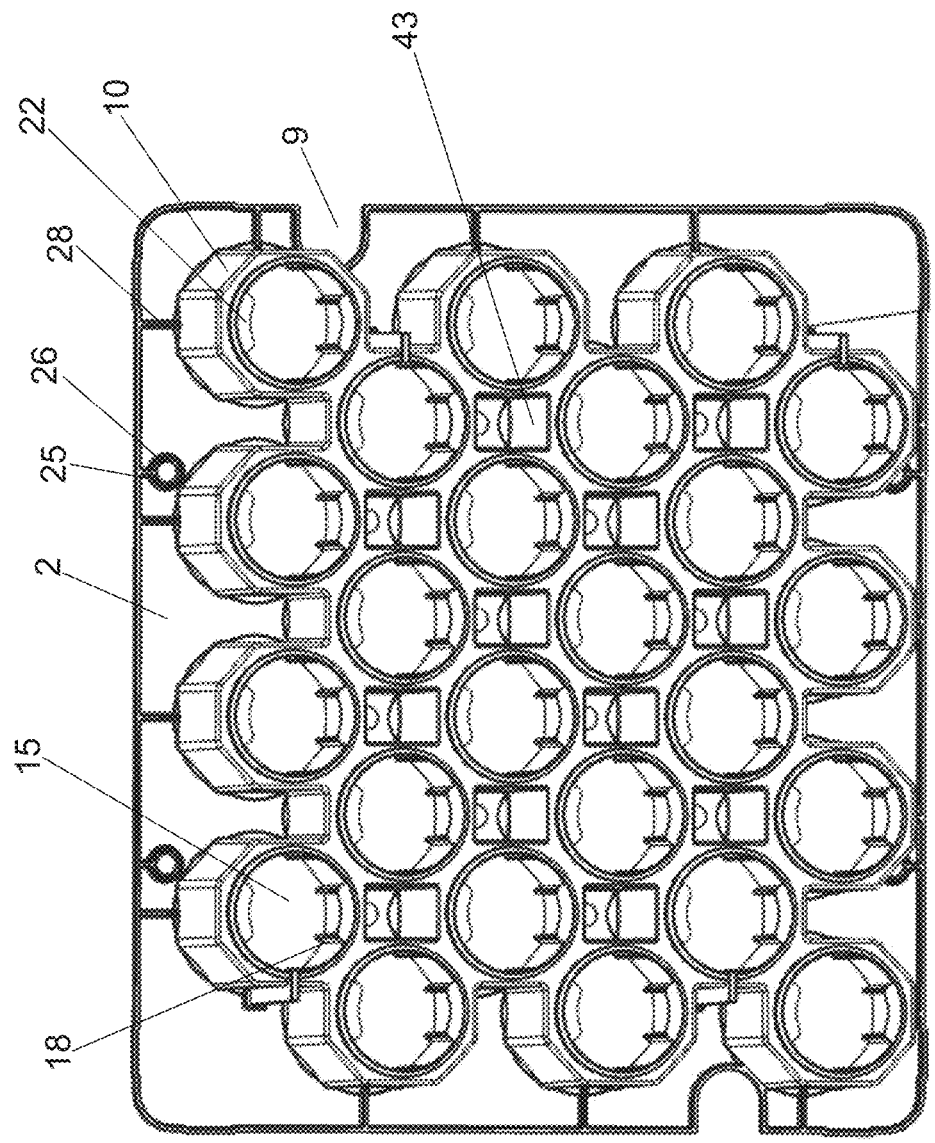
FIG. 3B illustrates the supporting structure of FIG. 3A in a perspective view from below.
Figure 3C:
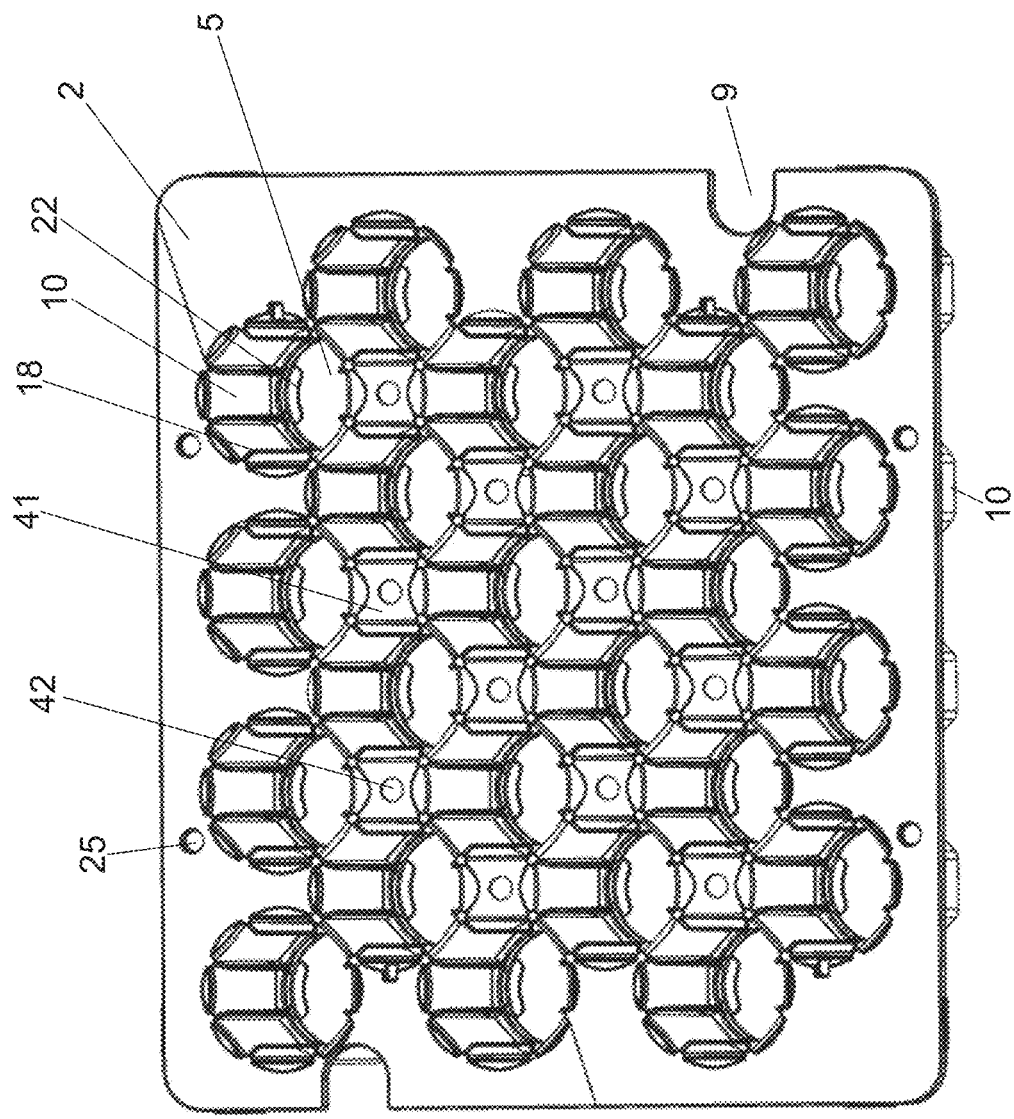
FIG. 3C illustrates the supporting structure of FIG. 3A in a perspective view in a plan view.
Figure 3D:
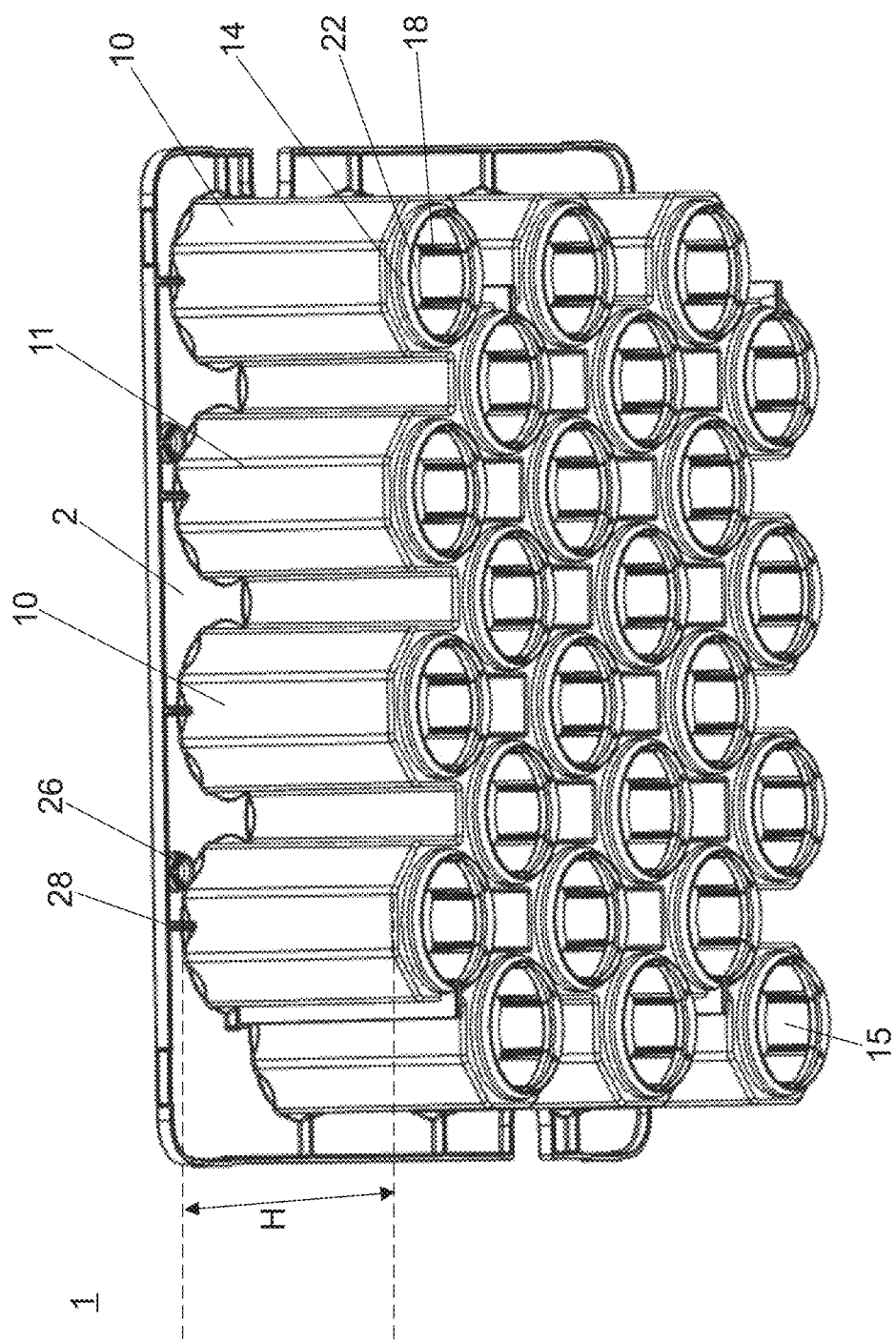
FIG. 3D illustrates the supporting structure of FIG. 3A in another perspective view from below.
Figure 3E:
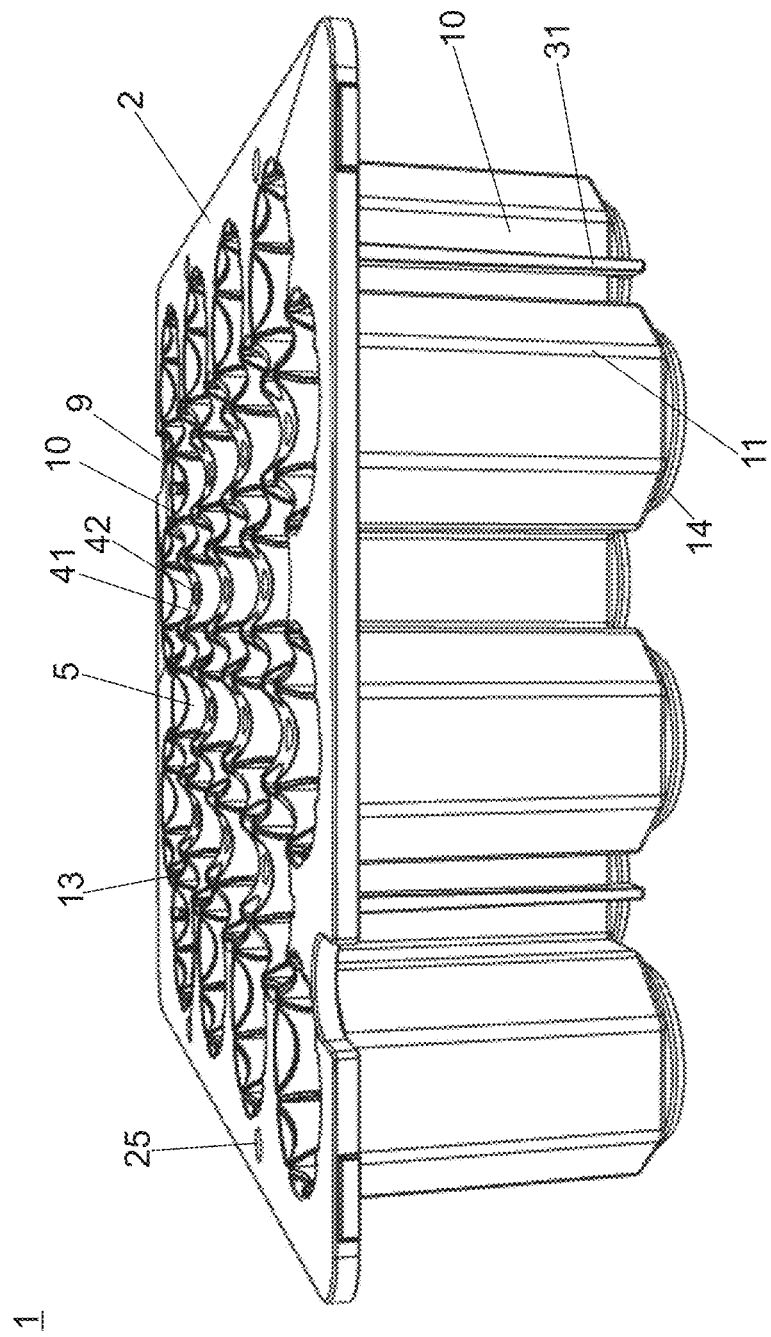
FIG. 3E illustrates the supporting structure of FIG. 3aA in another perspective view in a plan view under a different angle.
Figure 3F:
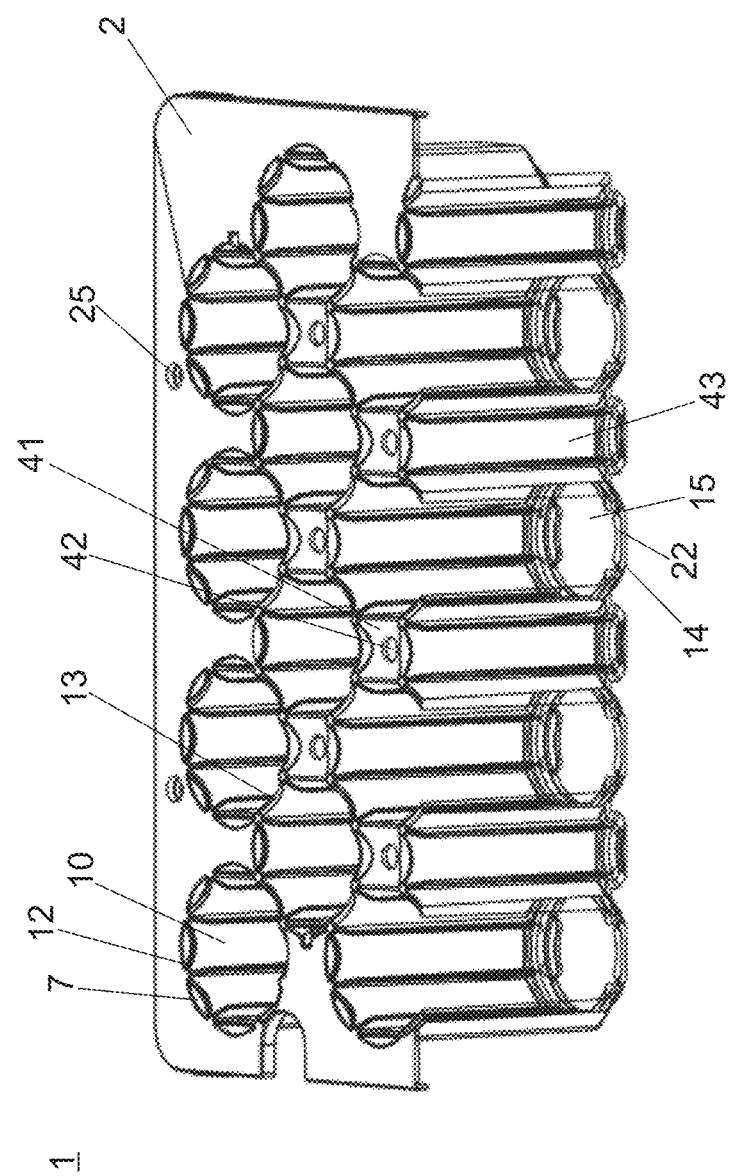
FIG. 3F illustrates the supporting structure of FIG. 3A in a perspective partial section.
Figure 3G:
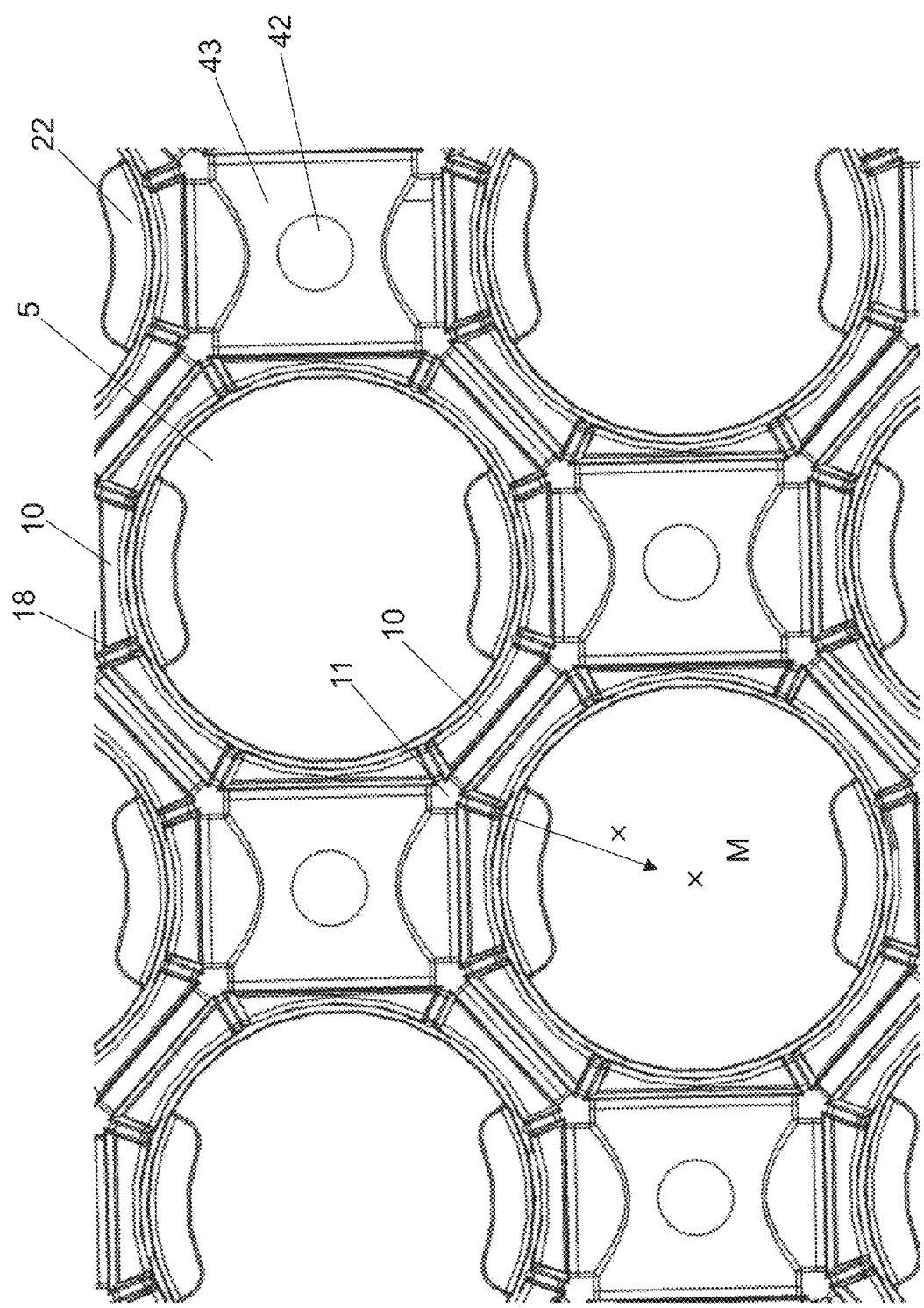
FIG. 3G illustrates the supporting structure of FIG. 3A in a highly magnified partial view from below.

The sectional drawings shown in FIGS. 2C and 2D show that the lower ends of the side-walls 10 are widened to form connecting webs 16 which fill the entire space between the end rings 14 and together span a plane in parallel with the plate-shaped upper side 2 of the supporting structure 1. The end rings 14 protrude from these connecting webs 16. FIGS. 2C and 2D show that there can be sufficient clearance between the upper edge 13 of the side-walls 10 and the connecting web 16 in the stacked arrangement, which facilitates stackability, since undesirable tilting of the upper ends 13 of the side-walls 10 of a lower supporting structure 1b in the spaces between the end rings 14 of an upper supporting structure 1a is always prevented. It is therefore advisable that an upper supporting structure 1a rests on the upper side 2b of a lower supporting structure 1b only in the regions of spacer members 31 (or of the frustoconical protrusions 26 (see FIG. 1C)).

FIGS. 3A to 3G show a supporting structure according to an exemplary embodiment of the present invention in different views. In contrast to the previously described embodiment, the receptacles 5 in this embodiment are octagonal. This means that two directly adjacent receptacles 5 always share only a single side-wall 10. A central connecting portion 40 with an essentially rectangular basic shape is thus formed centrally between four adjacent receptacles 5 arranged in a rhombic arrangement. In principle, this central connecting portion 40 may also be formed integrally of a solid material. This central connecting portion 40 may be formed as a cuboid cavity 43, which extends from the upper side 2 of the supporting structure 1 over the entire length of the receptacles 5 and whose lower end is open. This nevertheless allows a sufficient inherent stiffness of the supporting structure 1 to be achieved. As can be concluded from FIGS. 3A and 3B, there is an opening at the upper end of cavity 43. In the manufacture of such a supporting structure by injection molding from a plastic material, this cavity 43 is defined by a cuboid protrusion on one half of the mold. A protrusion at the upper end of this cuboid protrusion serves as a rigid connection with the opposite half of the mold, so that the supporting structure 1 can be manufactured even more precisely. The opening 42 formed by this protrusion can serve later as a vent opening to allow a gas to flow between the underside and the upper side of the supporting structure 1, for example a gas used to sterilize the supporting structure 1 and/or the containers held thereon, such as ethylene oxide (ETO). As can be concluded from FIG. 3G, in this embodiment the guide ribs 18 are always arranged in the corner regions 12 of the receptacles 5. The guide ribs 18 can project inwards into the receptacles 5 in the direction (x) towards the geometric center M of the respective receptacle 5, so that the guide ribs 18 are diametrically opposite in each case. However, it is also conceivable that the guide ribs project inwards into the receptacles 5 in a direction, which deviates from this direction (x) at a small angle (for example in the range between 1° and) 10°.

A supporting structure with a hexagonal basic shape of the receptacles 5 can be used particularly for containers of a relatively small nominal volume (e.g. up to max. 15 ml), of a relatively small diameter or for high, relatively slim containers. A supporting structure with an octagonal basic shape of the receptacles 5 can be used in particular for containers of a relatively large nominal volume (e.g. larger than 15 ml), of a relatively large diameter or for low, relatively wide containers.

The inherent stiffness of the supporting structure 1 allows in particular further processing of the containers while they are accommodated in the receptacles 5. It is conceivable, for example, that a supporting structure 1 is placed along the edge of its underside on a holding frame and then closure elements, such as closure plugs, are placed on the ends of the containers and these are axially displaced, such as concurrently for all the containers accommodated in the receptacles of the supporting structure or for one or more rows of containers. The forces prevailing in this case are sufficiently compensated by the supporting structure so that only a slight bending of the supporting structure occurs (e.g. a maximum of 2.0 mm over the length of the supporting structure), so that tilting of the closure elements can be avoided.

Conventionally, the axial course of the guide ribs 18 is optimized for better capturing and insertion of the containers into the receptacles. Examples can be found in German Utility Model 20 2016 107 209 and in U.S. Patent Application 2018/0208377 A1 or also in International Patent Application WO 2017/038878 A1. However, the guide ribs 18 are conventionally not optimized with regard to their cross-section. However, an unfavorable cross-section of the guide ribs, especially when the containers are slightly eccentric, can lead to unwanted abrasion or optically visible damage, such as scratch marks (so-called vialmarks), which are not accepted by the customer.

The following geometries are generally conceivable for the front side (facing the container) of the guide ribs 18:

Case a) the front side of the guide ribs 18 is flattened and planar, the corner regions of the guide ribs 18 are rounded;

Case b) the front side of the guide ribs 18 is flattened and planar, the corner regions of the guide ribs 18 are edged and right-angled;

Case c) the front side of the guide ribs 18 is concavely curved (with a radius of curvature matched to the outer contour of the container to be accommodated), corner regions of the guide ribs 18 are rounded.

Extensive research has shown that with a perfect centering of the containers in the receptacles 5, the geometry according to case a) allows a good contact and guiding surface for the containers, that good results can also be achieved with the geometry according to case b), but that an optimal contact and guiding surface for the containers is possible with the geometry according to case c).

However, surprisingly the result is totally different if the containers are not perfectly aligned, when the containers are inserted into the receptacles. Thus, for the insertion of the containers into the receptacles in case of an imperfect alignment of the containers, it has been found that the geometry according to case a) allows an optimal contact and guiding surface for the containers, that good results can also be achieved with the geometry according to case b), but that the geometry according to case c) results in only an insufficient contact and guiding surface for the containers, which in particular leads to undesired abrasion or optically visible damage, such as scratch marks (so-called vialmarks).

Figure 4A:
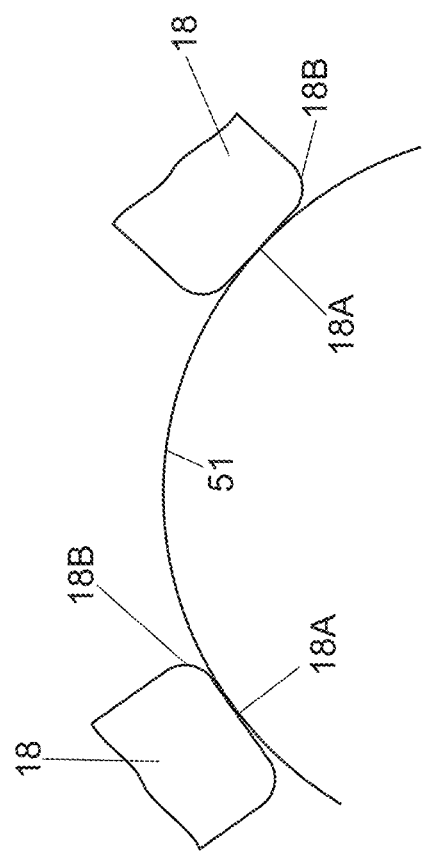
FIG. 4A illustrates in a schematic plan view, the support of the edge of a vial on two guide ribs in a supporting structure according to the present invention.

Since an imperfect alignment of the containers is the more frequent case when inserting the containers into the receptacles, according to the present invention a compromise for the geometry of the guide ribs 18 may be used, namely that at least at the lower ends of the guide ribs 18 (or over the entire length of the guide ribs 18) in each case a flattened portion 18a is provided, the corner regions 18b of which are rounded, as shown in FIG. 4A.

Figure 4C:
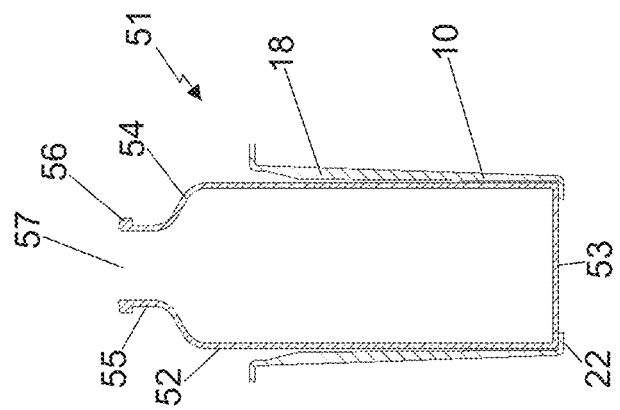
FIG. 4C illustrates how a vial is accommodated in a receptacle of a supporting structure according to the present invention.
Figure 4B:
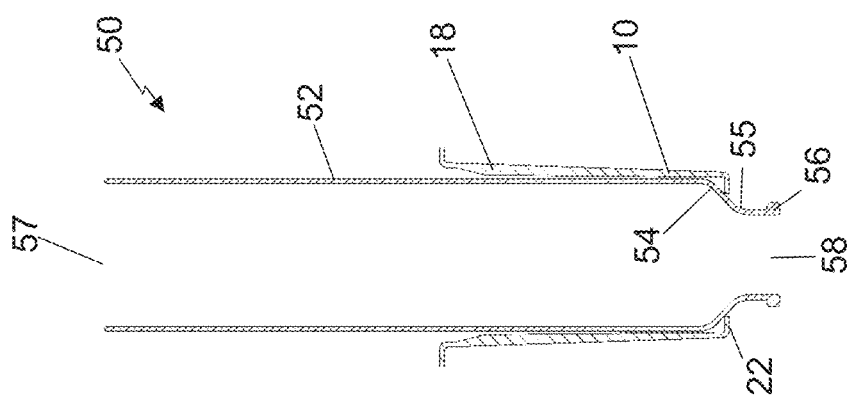
FIG. 4B illustrates how a cartridge is accommodated in a receptacle of a supporting structure according to the present invention.

FIG. 4B shows how a cartridge 50 is accommodated, which can be inserted vertically from above into the receptacle 5 of a supporting structure. Cartridges 50 are hollow cylindrical, having a cylindrical side-wall 52 which merges over a shoulder portion 54, which extends obliquely thereto, into a constricted neck portion 55 having a smaller outer diameter than the cylindrical side-wall 52, at the front end of which a widened rim 56 having an ejection opening 58 is formed. This can be closed by a stopper or plug (not shown). The stopper can be secured at the front end of the cartridge 50 by a crimped metal lid (so-called pre-crimped cartridge). At its rear end, the cartridge 50 is open, with a filling opening 57 through which a liquid substance can be filled.

When a cartridge 50 is inserted vertically from above into the receptacle 5, the shoulder portion 54 is finally directly supported on the holding protrusions 22. In this condition, the front end of the cylindrical side-wall 52 lies directly against the lower end of the side-wall 10 and is centered and supported in the receptacle 5. In this condition, the front end of the cartridge including the constricted neck portion 55 and the widened upper rim 56 extends through the opening between the holding protrusions 22, possibly including a metal lid crimped onto it (not shown). The metal lid does not come into contact with the holding protrusions 22, so that no forces are exerted on these and the stopper can safely close the filling opening 57 of the cartridge 50, even if large axial forces act on the cartridge 50, for example when inserting plugs into the filling opening 57, while the cartridge 50 is accommodated and supported upside down in the receptacles 5 in the position of FIG. 4B. In this position, the rear ends of the cartridges 50 protrude from the receptacles 5.

In a similar manner, FIG. 4C shows how a vial 51 is accommodated, which is inserted from vertically above into the receptacle 5 of a supporting structure. It is shown that the vial 51 was inserted upright. In principle, however, the vial 51 may also be inserted upside down, in the same way as the cartridge, as shown in FIG. 4B. In the fully inserted state, the bottom 53 of the vial 51 is supported on the holding protrusions 22 and the vial 51 is thus axially secured in the receptacle 5.

A supporting structure 1, as described above, can be used for the storage and transport of pharmaceutical containers such as vials or cartridges. For handling, the supporting structure 1 can be gripped and guided by grippers or the like via the access openings 9. The pharmaceutical containers can be further processed or treated while being supported or held by the supporting structure 1, as described previously. For sterile transport, such a supporting structure may be stored as a so-called nest in a tub-shaped transport or packaging container, for example in the manner disclosed in European Patent Application EP 2 868 593 A1, the contents of which are hereby incorporated herein by reference. The transport or packaging container may be closed or sealed by a gas-permeable plastic film, in particular by a plastic film which is formed from a gas-permeable braid of plastic fibers and in particular is a Tyveck® film.

For sterile transport, such a transport or packaging container may be placed in at least one sterile outer packaging bag, possibly together with other similar transport or packaging containers, and packed sterile against the environment. The at least one sterile outer packaging bag may comprise a gas-permeable portion or even be completely formed by it, which is formed in particular by a braid of plastic fibers, such as polypropylene fibers (PP).

As mentioned previously, the design of the supporting structure is optimized with regard to the packing density that can be achieved. In the solution according to the present invention, the respectively adjacent walls of the receptacles are combined to form one common wall which is commonly used or shared by two adjacent receptacles. Thin-walled, easily breakable and difficult to cool rib-like contours in tool design can thus be avoided according to the present invention, resulting in a longer tool life. Furthermore, the cycle time of the manufacturing process can be significantly shortened and unit costs can be reduced.

According to the present invention, the conventional round geometry of the receptacles is converted into a hexagonal structure for relatively small volumes of the containers (e.g. up to 15 ml) and into an octagonal structure for even larger volumes of the containers (e.g. larger than 15 ml), in which an arrangement of the receptacles under 45° and 90° is possible. A very high packing density can thus be achieved. At the same time, the design of the mold for manufacturing by injection molding from a plastic material is significantly simplified. It is very easy to implement a cooling of the tools and the material and the cores of the tools can be produced in a simple and also standardized manner.

The design of the supporting structure has also been optimized with regard to stiffness and lightweight construction. In particular the honeycomb design offers considerable advantages with regard to the bending or warpage requirements (a bending of max. 2 mm in relation to the total area of the holding surface and measured when empty could be easily achieved).

The angular design of the receptacles in combination with the guide ribs also provides good accessibility for steam sterilization (e.g. using ETO in an autoclave).

A horizontal (flat) tool separation also has a very favorable effect on the separating forces during demolding of the supporting structure and thus on the risk of formation of disturbing burrs and thus potential particles due to tool wear. In addition, tool separation no longer takes place in the immediate region of the supporting structure itself.

Due to the optimized position of the mold parting line, a supporting structure provided according to the present invention has proven to be fully cleanroom-compatible, because it significantly reduces the risk of particle formation during demolding of the supporting structure but also during subsequent use (especially due to the optimized geometry of the guide ribs 18).

A supporting structure in the sense of the present invention can be formed integrally, in particular by injection molding from a plastic material. Generally, the production by 3D-printing from a plastic material is also conceivable. Thus a further aspect of the present invention relates to a computer- or processor-readable file, also for transmission via networks, such as an internal computer network or of a company or via the Internet, comprising instructions or control commands which, when loaded by a computer or processor, cause a 3D-printer, under the control of the computer or processor, to print a supporting structure, as disclosed in the present application, of a suitable material, in particular of a plastic material, in three-dimensional form.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS 1 supporting structure
1a upper supporting structure
1b lower supporting structure
2 upper side/plate-shaped carrier
2a upper side of upper supporting structure 1a
2b upper side of upper supporting structure 1b
3 angled edge
4 rounded corner region
5 receptacle (polygonal)
7 rounded edge region
10 side-wall
11 connection region of several side-walls 10
12 corner region of receptacle 5
13 upper edge of side-wall 10
14 end ring
15 opening
16 connecting web
18 guide rib
18a flattened front end of guide rib 18
18b rounded corner region of guide rib 18
19 lead-in bevel of guide rib 18
22 holding protrusion
25 opening
26 truncated conical protrusion
28 connecting web
30 slot
31 spacer member
40 central connection portion
41 upper edge of central connecting portion
42 opening
43 cavity
50 cartridge/container
51 vial/container
52 side-wall
53 bottom
54 shoulder portion
55 constricted neck portion
56 upper rim
57 filling opening
58 ejection opening
H height of side-wall 10
M geometric center of receptacle 5
x extension direction of guide rib 18

What is claimed is:

1. A supporting structure for concurrently supporting a plurality of containers for substances for pharmaceutical, medical or cosmetic applications, the supporting structure comprising:
a plurality of receptacles configured to receive the containers, the receptacles being arranged in a regular arrangement and formed by side-walls which are each of circumferential construction, the receptacles being polygonal in shape when viewed in a plan view, a side-wall is formed as a common partition wall between respective two directly adjacent receptacles of the plurality of receptacles, a lower end of each receptacle connecting to a respective end ring;
an upper side formed as a plate-shaped carrier, the side-walls and the receptacles projecting perpendicularly from the plate-shaped carrier; and
a plurality of holding protrusions, each of the holding protrusions being provided at the lower end of a respective one of the receptacles and protruding radially inwards into the respective receptacle, each of the holding protrusions being cantilevered to the respective end ring of the respective receptacle and extending about a portion of a circumference of the respective receptacle, wherein each end ring comprises a central opening, wherein lower ends of the side-walls of the receptacles jointly span a plane extending in parallel with an upper side of the supporting structure, the end rings projecting beyond the plane jointly spanned by the lower ends of the side-walls, wherein an outer diameter of the end rings is smaller than a minimum opening width of the receptacles on an upper side of the supporting structure, so that a plurality of supporting structures of identical configuration are arrangeable in a stacked arrangement in which the end rings of an upper supporting structure are inserted into upper ends of the receptacles of an underneath lower supporting structure.

2. The supporting structure of claim 1, wherein a height of the respective common partition wall corresponds substantially to an axial length of the two directly adjacent receptacles and the respective common partition wall is formed from a solid material over at least 80% of this height.

3. The supporting structure of claim 2, wherein a plurality of common partition walls is formed by a plurality of the side-walls and the common partition walls, viewed in a cross-section, are each formed in one piece and without perforations.

4. The supporting structure of claim 1, wherein the side-walls of the receptacles are each formed as flat partition walls and the side-walls of directly adjacent receptacles converge in a connecting region which extends in each case in a longitudinal direction of the receptacles and is arranged in a corner region of the respective receptacles.

5. The supporting structure of claim 1, wherein the receptacles are each hexagonal in shape when viewed in a plan view and the receptacles are arranged in a regular arrangement directly adjacent to one another with hexagonal symmetry.

6. The supporting structure of claim 1, wherein the receptacles are each octagonal in shape when viewed in a plan view, wherein four adjacent receptacles arranged in a rhombic arrangement each enclose a central connecting portion with a thickness that is greater than a thickness of the common partition walls.

7. The supporting structure of claim 6, wherein the central connecting portions each enclose a cavity extending in a longitudinal direction of the adjacent receptacles.

8. The supporting structure of claim 1, wherein a plurality of apertures is formed in the upper side of the plate-shaped carrier, for positioning the supporting structure by correspondingly formed positioning protrusions on an associated receptacle of the supporting structure.

9. The supporting structure of claim 8, wherein the apertures are formed as circular openings and wherein frustoconical protrusions, which enclose the openings, are formed on an underside of the plate-shaped carrier.

10. The supporting structure of claim 1, wherein upper ends of the side-walls facing the upper side of the supporting structure have an arcuately concave curved course.

11. The supporting structure of claim 1, wherein guide ribs are formed on the side-walls and extend in a longitudinal direction of the receptacles.

12. The supporting structure of claim 11, wherein lead-in bevels are formed at upper ends of the guide ribs, which are inclined relative to the guide ribs.

13. The supporting structure of claim 11, wherein the guide ribs are arranged in corner regions of the receptacles, wherein at least at lower ends of the guide ribs a respective flattened portion is provided with corner regions that are rounded.

14. The supporting structure of claim 11, wherein the guide ribs protrude inwardly into the receptacles in a direction towards a geometric center of the respective receptacle.

15. The supporting structure of claim 1, wherein spacer members are provided on an underside of the supporting structure to mechanically limit a depth of insertion of the end rings of an upper supporting structure into the upper ends of the receptacles of the underneath lower supporting structure.

16. A supporting structure for concurrently supporting a plurality of containers for substances for pharmaceutical, medical or cosmetic applications, the supporting structure comprising:
a plurality of receptacles configured to receive the containers, the receptacles being arranged in a regular arrangement and formed by side-walls which are each of circumferential construction, the receptacles being polygonal in shape when viewed in a plan view, a plurality of the side-walls being formed as common partition walls between respective two directly adjacent receptacles of the plurality of receptacles, the common partition walls, viewed in a cross-section, each being formed in one piece and without perforations, lower ends of the receptacles each merging into a circular end ring with a central opening, lower ends of the side-walls of the receptacles jointly spanning a plane extending in parallel with an upper side of the supporting structure, the end rings projecting beyond the plane jointly spanned by the lower ends of the side-walls;
a plurality of holding protrusions, each of the holding protrusions being provided at a respective lower end of a respective one of the receptacles and protruding radially inwards into the respective receptacle, each of the holding protrusions being cantilevered to a respective one of the end rings and extending about a portion of a circumference of the respective receptacle;
an upper side formed as a plate-shaped carrier, the side-walls and the receptacles projecting perpendicularly from the plate-shaped carrier; and
a plurality of guide ribs formed on the side-walls in corner regions of the receptacles and extending in a longitudinal direction of the receptacles, wherein the guide ribs are arranged in corner regions of the receptacles, wherein at least at lower ends of the guide ribs a respective flattened portion is provided with corner regions that are rounded.

17. The supporting structure of claim 16, wherein lead-in bevels are formed at upper ends of the guide ribs, which are inclined relative to the guide ribs.

18. A transport structure, consisting of:
a supporting structure comprising:
a plurality of receptacles configured to receive the containers, the receptacles being arranged in a regular arrangement and formed by side-walls which are each of circumferential construction, the receptacles being polygonal in shape when viewed in a plan view, a side-wall is formed as a common partition wall between respective two directly adjacent receptacles of the plurality of receptacles, a lower end of each receptacle connecting to a respective end ring;
an upper side formed as a plate-shaped carrier, the side-walls and the receptacles projecting perpendicularly from the plate-shaped carrier; and
a plurality of holding protrusions, each of the holding protrusions being provided at the lower end of a respective one of the receptacles and protruding radially inwards into the respective receptacle, each of the holding protrusions being cantilevered to the respective end ring of the respective receptacle and extending about a portion of a circumference of the respective receptacle, wherein each end ring comprises a central opening, wherein lower ends of the side-walls of the receptacles jointly span a plane extending in parallel with an upper side of the supporting structure, the end rings projecting beyond the plane jointly spanned by the lower ends of the side-walls, wherein an outer diameter of the end rings is smaller than a minimum opening width of the receptacles on an upper side of the supporting structure, so that a plurality of supporting structures of identical configuration are arrangeable in a stacked arrangement in which the end rings of an upper supporting structure are inserted into upper ends of the receptacles of an underneath lower supporting structure; and
a plurality of containers for substances for pharmaceutical, medical or cosmetic applications held by the supporting structure such that the containers are accommodated at least in sections in the receptacles of the supporting structure.

19. The transport structure of claim 18, wherein guide ribs are formed on the side-walls and extend in a longitudinal direction of the receptacles, wherein the guide ribs are arranged in corner regions of the receptacles, wherein at least at lower ends of the guide ribs a respective flattened portion is provided with corner regions that are rounded.

20. The transport structure of claim 19, wherein lead-in bevels are formed at upper ends of the guide ribs, which are inclined relative to the guide ribs.

* * * * *